US012111713B2

(12) United States Patent
Giusti et al.

(10) Patent No.: US 12,111,713 B2
(45) Date of Patent: *Oct. 8, 2024

(54) SMARTPHONE-BASED RADAR SYSTEM FOR DETERMINING USER INTENTION IN A LOWER-POWER MODE

(71) Applicant: Google LLC, Mountain View, CA (US)

(72) Inventors: Leonardo Giusti, San Francisco, CA (US); Ivan Poupyrev, Sunnyvale, CA (US); Eiji Hayashi, Cupertino, CA (US); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,488

(22) Filed: Feb. 9, 2022

(65) Prior Publication Data
US 2022/0269329 A1 Aug. 25, 2022

Related U.S. Application Data

(63) Continuation of application No. 17/035,059, filed on Sep. 28, 2020, now Pat. No. 11,314,312, which is a
(Continued)

(51) Int. Cl.
G06F 1/3231 (2019.01)
G01S 7/35 (2006.01)
(Continued)

(52) U.S. Cl.
CPC .............. G06F 1/3231 (2013.01); G01S 7/35 (2013.01); G01S 13/04 (2013.01); G06F 1/3287 (2013.01); G06F 3/017 (2013.01)

(58) Field of Classification Search
CPC ...... G06F 1/3231; G06F 1/3287; G06F 3/017; G01S 7/35; G01S 13/04
See application file for complete search history.

(56) References Cited

U.S. PATENT DOCUMENTS 6,971,072 B1  11/2005  Stein
7,924,212 B2   4/2011  Benitez et al.
(Continued)

FOREIGN PATENT DOCUMENTS

CL   107430443   12/2017
CN   102906623    1/2013
(Continued)

OTHER PUBLICATIONS

"Foreign Office Action", EP Application No. 20172743.5, Oct. 26, 2022, 5 pages.
(Continued)

Primary Examiner — Nimesh G Patel
(74) Attorney, Agent, or Firm — Colby Nipper PLLC

(57) ABSTRACT

This document describes techniques and systems that enable a smartphone-based radar system for determining user intention in a lower-power mode. The techniques and systems use a radar field to enable the smartphone to accurately determine the presence or absence of a user and further determine the intention of the user to interact with the smartphone. Using these techniques, the smartphone can account for the user's nonverbal communication cues to determine and maintain an awareness of users in its environment, and only respond to direct interactions once a user has demonstrated an intention to interact, which preserves battery power. The smartphone may determine the user's intention by recognizing various cues from the user, such as a change in position relative to the smartphone, a change in posture, or by an explicit action, such as a gesture.

22 Claims, 19 Drawing Sheets

Related U.S. Application Data continuation of application No. 16/166,900, filed on Oct. 22, 2018, now Pat. No. 10,788,880.

(51) Int. Cl.
*G01S 13/04* (2006.01)
*G06F 1/3287* (2019.01)
*G06F 3/01* (2006.01)

(56) References Cited

U.S. PATENT DOCUMENTS

| | | |
|---|---|---|
| 8,260,368 B2 | 9/2012 | Yin |
| 8,560,128 B2 | 10/2013 | Ruff et al. |
| 8,723,986 B1 | 5/2014 | Merrill |
| 8,803,697 B2 | 8/2014 | Rautiainen |
| 8,837,696 B2 | 9/2014 | Meriaz et al. |
| 9,075,435 B1 | 7/2015 | Noble et al. |
| 9,569,003 B2 | 2/2017 | Rofougaran et al. |
| 9,589,565 B2 | 3/2017 | Boies et al. |
| 9,600,177 B2 | 3/2017 | Iyer et al. |
| 9,632,584 B2 | 4/2017 | Dodge |
| 9,747,072 B2 | 8/2017 | Noble et al. |
| 9,811,164 B2 | 11/2017 | Poupyrev |
| 9,921,657 B2 | 3/2018 | Sprenger et al. |
| 10,217,488 B1 | 2/2019 | Huang |
| 10,698,603 B2 | 6/2020 | Giusti et al. |
| 10,761,611 B2 | 9/2020 | Giusti et al. |
| 10,770,035 B2 | 9/2020 | Giusti et al. |
| 10,788,880 B2 | 9/2020 | Giusti et al. |
| 10,890,653 B2 | 1/2021 | Giusti |
| 10,930,251 B2 | 2/2021 | Giusti et al. |
| 10,936,185 B2 | 3/2021 | Giusti et al. |
| 11,176,910 B2 | 11/2021 | Giusti et al. |
| 11,204,694 B2 | 12/2021 | Giusti et al. |
| 11,314,312 B2 | 4/2022 | Giusti et al. |
| 11,435,468 B2 | 9/2022 | Giusti et al. |
| 2004/0100497 A1 | 5/2004 | Quillen et al. |
| 2005/0002530 A1 | 1/2005 | Kogan |
| 2005/0128124 A1 | 6/2005 | Greneker et al. |
| 2005/0242984 A1 | 11/2005 | Waters |
| 2007/0015559 A1 | 1/2007 | Zalewski et al. |
| 2007/0117625 A1 | 5/2007 | Marks et al. |
| 2007/0202858 A1 | 8/2007 | Yu |
| 2008/0029316 A1 | 2/2008 | Jaeger et al. |
| 2008/0055105 A1 | 3/2008 | Blum et al. |
| 2009/0228841 A1 | 9/2009 | Hildreth |
| 2009/0237371 A1 | 9/2009 | Kim |
| 2009/0322690 A1 | 12/2009 | Hiltunen et al. |
| 2010/0017722 A1 | 1/2010 | Cohen |
| 2011/0181509 A1 | 7/2011 | Rautiainen et al. |
| 2011/0181510 A1 | 7/2011 | Hakala et al. |
| 2011/0221667 A1 | 9/2011 | Lee |
| 2011/0237274 A1 | 9/2011 | Wong et al. |
| 2011/0313768 A1 | 12/2011 | Klein et al. |
| 2012/0235855 A1* | 9/2012 | Kurtz .................. G01S 13/584 342/128 |
| 2012/0280900 A1 | 11/2012 | Wang et al. |
| 2013/0023248 A1 | 1/2013 | Lee |
| 2013/0053007 A1 | 2/2013 | Cosman et al. |
| 2013/0057571 A1 | 3/2013 | Harris |
| 2013/0120458 A1 | 5/2013 | Celebisoy et al. |
| 2013/0241823 A1 | 9/2013 | Pryor |
| 2013/0300671 A1 | 11/2013 | Hallerström Sjöstedt et al. |
| 2014/0267130 A1 | 9/2014 | Hwang et al. |
| 2014/0315531 A1 | 10/2014 | Joong et al. |
| 2014/0347188 A1 | 11/2014 | Alameh et al. |
| 2014/0379341 A1 | 12/2014 | Seo et al. |
| 2014/0380249 A1 | 12/2014 | Fleizach |
| 2015/0036999 A1 | 2/2015 | Batur et al. |
| 2015/0145993 A1* | 5/2015 | Scalisi .................. H04M 11/025 348/143 |
| 2015/0186569 A1 | 7/2015 | Sekine et al. |
| 2015/0187137 A1 | 7/2015 | Mullins |
| 2015/0277569 A1 | 10/2015 | Sprenger et al. |
| 2015/0285898 A1* | 10/2015 | Testar .................. G01S 7/4008 342/175 |
| 2015/0346820 A1 | 12/2015 | Poupyrev et al. |
| 2015/0365540 A1 | 12/2015 | Davis et al. |
| 2015/0370443 A1 | 12/2015 | Ben-Bassat |
| 2015/0370472 A1 | 12/2015 | Privault et al. |
| 2016/0026327 A1 | 1/2016 | Park et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0062590 A1 | 3/2016 | Karunamuni et al. |
| 2016/0098089 A1 | 4/2016 | Poupyrev |
| 2016/0140763 A1 | 5/2016 | Seichter et al. |
| 2016/0162145 A1 | 6/2016 | Rivers et al. |
| 2016/0234369 A1 | 8/2016 | Jung et al. |
| 2016/0241720 A1 | 8/2016 | Cheatham et al. |
| 2016/0252607 A1* | 9/2016 | Saboo .................. G01S 13/02 342/107 |
| 2016/0259037 A1 | 9/2016 | Molchanov et al. |
| 2016/0358588 A1 | 12/2016 | O'Neill |
| 2017/0040002 A1 | 2/2017 | Basson et al. |
| 2017/0097413 A1* | 4/2017 | Gillian .................. A63F 13/21 |
| 2017/0235458 A1 | 8/2017 | Tsurumi |
| 2017/0289766 A1 | 10/2017 | Scott et al. |
| 2017/0289954 A1 | 10/2017 | Mese et al. |
| 2017/0308131 A1 | 10/2017 | Geva |
| 2017/0328997 A1* | 11/2017 | Silverstein .............. G01S 13/86 |
| 2017/0329449 A1 | 11/2017 | Silverstein et al. |
| 2017/0349184 A1 | 12/2017 | Tzirkel-Hancock et al. |
| 2018/0018965 A1 | 1/2018 | Daley |
| 2018/0032997 A1 | 2/2018 | Gordon et al. |
| 2018/0098351 A1* | 4/2018 | Amel .................. H04B 1/0053 |
| 2018/0120946 A1 | 5/2018 | Cho |
| 2018/0224980 A1 | 8/2018 | Avila et al. |
| 2018/0329049 A1* | 11/2018 | Amihood .......... H04W 52/0219 |
| 2018/0329050 A1 | 11/2018 | Amihood et al. |
| 2018/0374143 A1 | 12/2018 | Williamson et al. |
| 2019/0286912 A1 | 9/2019 | Chan et al. |
| 2020/0057504 A1 | 2/2020 | Lien et al. |
| 2020/0064445 A1 | 2/2020 | Amihood et al. |
| 2020/0064458 A1 | 2/2020 | Giusti et al. |
| 2020/0064996 A1 | 2/2020 | Giusti et al. |
| 2020/0066236 A1 | 2/2020 | Giusti et al. |
| 2020/0125158 A1 | 4/2020 | Giusti et al. |
| 2020/0150771 A1 | 5/2020 | Giusti et al. |
| 2020/0193942 A1 | 6/2020 | Giusti et al. |
| 2020/0272322 A1 | 8/2020 | Zhu et al. |
| 2020/0285383 A1 | 9/2020 | Giusti et al. |
| 2020/0372879 A1 | 11/2020 | Giusti et al. |
| 2021/0026434 A1 | 1/2021 | Giusti et al. |
| 2021/0072370 A1 | 3/2021 | Giusti et al. |
| 2021/0132788 A1 | 5/2021 | Giusti et al. |
| 2022/0036863 A1 | 2/2022 | Giusti et al. |

FOREIGN PATENT DOCUMENTS

| | | |
|---|---|---|
| CN | 103383607 | 11/2013 |
| CN | 103858073 | 6/2014 |
| CN | 104049737 | 9/2014 |
| CN | 204145834 | 2/2015 |
| CN | 104520849 | 4/2015 |
| CN | 104793731 | 7/2015 |
| CN | 105264461 | 1/2016 |
| CN | 105278674 | 1/2016 |
| CN | 105980812 | 9/2016 |
| CN | 106537173 | 3/2017 |
| CN | 106796789 | 5/2017 |
| CN | 106980362 | 7/2017 |
| CN | 107057169 | 8/2017 |
| CN | 107391004 A | 11/2017 |
| CN | 107430443 | 12/2017 |
| CN | 107430444 | 12/2017 |
| CN | 107765846 | 3/2018 |
| CN | 108334199 | 7/2018 |
| CN | 108700645 | 10/2018 |
| EP | 0325539 | 7/1989 |
| EP | 1309211 | 5/2003 |
| EP | 2560145 | 2/2013 |
| EP | 2637079 | 9/2013 |

(56) References Cited

FOREIGN PATENT DOCUMENTS

| | | |
|---|---|---|
| EP | 2887092 | 6/2015 |
| GB | 2554957 | 4/2018 |
| JP | 11338120 | 12/1999 |
| JP | H11338120 | 12/1999 |
| JP | 2001033550 | 2/2001 |
| JP | 2006013819 | 1/2006 |
| JP | 2009237951 | 10/2009 |
| JP | 2010038607 | 2/2010 |
| JP | 2012048720 | 3/2012 |
| JP | 2013125328 | 6/2013 |
| JP | 2013546066 | 12/2013 |
| JP | 2014197317 | 10/2014 |
| JP | 2015141588 | 8/2015 |
| JP | 2015203835 | 11/2015 |
| JP | 2016035625 | 3/2016 |
| JP | 2016205907 | 12/2016 |
| JP | 2017111711 | 6/2017 |
| JP | 2018116653 | 7/2018 |
| JP | 2018527558 | 9/2018 |
| KR | 20160128318 | 11/2016 |
| KR | 20160148640 | 12/2016 |
| KR | 20180030123 | 3/2018 |
| TW | 201228332 | 7/2012 |
| TW | 201445029 | 12/2014 |
| TW | 201606572 | 2/2016 |
| TW | 1610084 | 3/2016 |
| TW | 1514193 | 7/2016 |
| TW | 201727439 | 8/2017 |
| WO | 2011149659 | 12/2011 |
| WO | 2016017978 | 2/2016 |
| WO | 2017018388 | 2/2017 |
| WO | 2018004757 | 1/2018 |
| WO | 2018118895 | 6/2018 |
| WO | 2018208958 | 11/2018 |
| WO | 2020040966 | 2/2020 |
| WO | 2020040968 | 2/2020 |
| WO | 2020040970 | 2/2020 |
| WO | 2020086215 | 4/2020 |
| WO | 2020101810 | 5/2020 |

OTHER PUBLICATIONS

"Foreign Office Action", EP Application No. 19759456.7, Feb. 16, 2022, 4 pages.

"Foreign Office Action", JP Application No. 2021-037423, Mar. 8, 2022, 10 pages.

"Foreign Office Action", KR Application No. 10-2020-7012253, Mar. 10, 2022, 5 pages.

"Notice of Allowance", U.S. Appl. No. 16/950,248, Mar. 14, 2022, 8 pages.

"Non-Final Office Action", U.S. Appl. No. 17/504,323, Aug. 4, 2022, 29 pages.

"EP Appeal Decision", EP Application No. 10194359.5, May 28, 2019, 20 pages.

"Extended European Search Report", EP Application No. 20172743.5, Sep. 9, 2020, 11 pages.

"First Action Interview Office Action", U.S. Appl. No. 16/189,346, Jan. 14, 2020, 3 Pages.

"First Action Interview Office Action", U.S. Appl. No. 16/109,534, Mar. 17, 2020, 3 Pages.

"Foreign Notice of Allowance", KR Application No. 10-2020-7033558, Sep. 6, 2021, 2 pages.

"Foreign Office Action", EP Application No. 19755482.7, Sep. 15, 2020, 11 pages.

"Foreign Office Action", JP Application No. 2020520030, Jan. 12, 2021, 11 pages.

"Foreign Office Action", TW Application No. 109141179, Nov. 29, 2021, 12 pages.

"Foreign Office Action", TW Application No. 108123712, Aug. 17, 2020, 12 pages.

"Foreign Office Action", KR Application No. 10-2020-7012253, Nov. 1, 2021, 13 pages.

"Foreign Office Action", TW Application No. 108123886, Jul. 29, 2021, 16 pages.

"Foreign Office Action", CN Application No. 201980004742.2, Aug. 5, 2020, 16 pages.

"Foreign Office Action", TW Application No. 108123712, Dec. 22, 2020, 2 pages.

"Foreign Office Action", TW Application No. 108123886, Mar. 5, 2021, 21 pages.

"Foreign Office Action", TW Application No. 108123886, Aug. 26, 2020, 23 pages.

"Foreign Office Action", EP Application No. 19755482.7, Jun. 17, 2020, 4 pages.

"Foreign Office Action", KR Application No. 10-2020-7013505, Jul. 5, 2021, 6 pages.

"Foreign Office Action", KR Application No. 10-2020-7033558, Jul. 5, 2021, 6 pages.

"Foreign Office Action", IN Application No. 202047011909, Aug. 4, 2021, 6 pages.

"Foreign Office Action", JP Application No. 2020-090667, Nov. 17, 2020, 6 pages.

"Foreign Office Action", JP Application No. 2020-517425, Nov. 24, 2020, 6 pages.

"Foreign Office Action", IN Application No. 202048017849, Dec. 22, 2021, 6 pages.

"Foreign Office Action", KR Application No. 1020207008514, May 15, 2020, 6 pages.

"Foreign Office Action", EP Application No. 19790359.4, Feb. 2, 2022, 8 pages.

"Foreign Office Action", TW Application No. 108123887, Jul. 15, 2020, 8 pages.

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"International Preliminary Report on Patentability", Application No. PCT/US2019/045142, Feb. 23, 2021, 11 pages.

"International Preliminary Report on Patentability", Application No. PCT/US2019/045144, Feb. 23, 2021, 11 pages.

"International Preliminary Report on Patentability", Application No. PCT/US2019/045128, Mar. 2, 2021, 15 pages.

"International Preliminary Report on Patentability", Application No. PCT/US2019/053602, Apr. 27, 2021, 15 pages.

"International Preliminary Report on Patentability", Application No. PCT/US2019/053568, May 18, 2021, 8 pages.

"International Search Report and Written Opinion", Application No. PCT/US2019/053568, Dec. 20, 2019, 14 pages.

"International Search Report and Written Opinion", Application No. PCT/US2019/045144, Jan. 2, 2020, 18 pages.

"International Search Report and Written Opinion", Application No. PCT/US2019/045142, Feb. 10, 2020, 19 pages.

"International Search Report and Written Opinion", Application No. PCT/US2019/045128, Jan. 14, 2020, 22 pages.

"International Search Report and Written Opinion", Application No. PCT/US2019/053602, Dec. 6, 2019, 23 pages.

"Invitation to Pay Additional Fees", Application No. PCT/US2019/045144, Oct. 28, 2019, 10 pages.

"Invitation to Pay Additional Fees", Application No. PCT/US2019/045142, Oct. 29, 2019, 10 pages.

"Invitation to Pay Additional Fees", Application No. PCT/US2019/045128, Nov. 11, 2019, 16 pages.

"Micropower Impulse Radar (MIR)", Ohio State et al., retrieved from the internet: http:..web.cse.ohio-state.edu/siefast/nest/nest_webpage/posters/OSU-poster-alineinthestand-MIR.pdf, Sep. 1, 2003, 1 page.

"Non-Final Office Action", U.S. Appl. No. 17/148,414, Jul. 2, 2021, 10 pages.

"Non-Final Office Action", U.S. Appl. No. 16/802,024, Oct. 7, 2020, 10 Pages.

"Non-Final Office Action", U.S. Appl. No. 16/112,130, Sep. 20, 2019, 14 Pages.

"Non-Final Office Action", U.S. Appl. No. 16/950,248, Sep. 22, 2021, 15 pages.

"Non-Final Office Action", U.S. Appl. No. 17/035,059, Aug. 5, 2021, 6 pages.

(56) References Cited

OTHER PUBLICATIONS

"Notice of Allowance", U.S. Appl. No. 16/884,943, Oct. 28, 2020, 11 pages.
"Notice of Allowance", U.S. Appl. No. 17/148,414, Sep. 14, 2021, 12 pages.
"Notice of Allowance", U.S. Appl. No. 16/109,534, Apr. 30, 2020, 5 Pages.
"Notice of Allowance", U.S. Appl. No. 16/802,024, Dec. 11, 2020, 5 pages.
"Notice of Allowance", U.S. Appl. No. 16/189,346, Apr. 15, 20, 6 Pages.
"Notice of Allowance", U.S. Appl. No. 16/166,900, May 15, 2020, 7 Pages.
"Notice of Allowance", U.S. Appl. No. 16/108,815, Sep. 15, 2020, 7 Pages.
"Notice of Allowance", U.S. Appl. No. 17/035,059, Nov. 29, 2021, 7 pages.
"Notice of Allowance", U.S. Appl. No. 16/112,130, Feb. 19, 2020, 8 Pages.
"Notice of Allowance", U.S. Appl. No. 16/986,062, Jul. 12, 2021, 8 pages.
"Position Sensors", https://developer.android.com/guide/topics/sensors/sensors_position.html, downloaded Mar. 22, 2018, 5 pages.
"Pre-Interview Communication", U.S. Appl. No. 16/109,534, Feb. 19, 2020, 3 Pages.
"Pre-Interview Communication", U.S. Appl. No. 16/108,815, Jun. 8, 2020, 3 pages.
"Pre-Interview Communication", U.S. Appl. No. 16/166,900, Mar. 19, 2020, 4 Pages.
"Pre-Interview Communication", U.S. Appl. No. 16/189,346, Dec. 13, 2019, 5 Pages.
"Restriction Requirement", U.S. Appl. No. 16/109,534, Jan. 7, 2020, 6 Pages.
"Samsung Galaxy S4 Air Gestures", Video retrieved from https://www.youtube.com/watch?v=375Hb87yGcg, May 7, 2013, 4 pages.
Cravotta, Nicholas, "Optimizing Proximity Sensing for Consumer Electronics Applications", Apr. 26, 2012, 7 pages.
Lien, Jaime et al., "Soli: Ubiquitous Gesture Sensing with Millimeter Wave Radar", ACM Trans. Graph., vol. 35, No. 4, Article 142, Jul. 1, 2016, 19 pages.
Paulson, Christine N. et al., "Ultra-Wideband Radar Methods and Techniques of Medical Sensing and Imaging", Sep. 2003, 12 pages.
"Foreign Office Action", CN Application No. 201980004932.4, Mar. 31, 2023, 27 pages.
"Extended European Search Report", EP Application No. 23159153.8, Jun. 23, 2023, 10 pages.
"Foreign Office Action", EP Application No. 19759456.7, Jul. 19, 2023, 4 pages.
"Foreign Office Action", CN Application No. 202010434459.8, Nov. 4, 2023, 16 pages.
"Foreign Office Action", CN Application No. 202110307190.1, Nov. 9, 2023, 14 pages.
"Foreign Office Action", CN Application No. 201980017941.7, Feb. 5, 2024, 14 pages.
"Foreign Office Action", EP Application No. 19790359.4, Feb. 6, 2024, 4 pages.
"Foreign Office Action", CN Application No. 201980017923.9, Feb. 8, 2024, 14 pages.
"Foreign Office Action", VN Application No. 1202001793, Sep. 29, 2023, 3 pages.

\* cited by examiner

Maintain the Radar System in an Idle Mode that Requires No More than 30 milliwatts (mW) of Power
710

Determine, Based on a First Subset of the Radar Data, a Presence of the Object within an Awareness Zone of the Electronic Device
712

In Response to Determining the Presence of the Object within the Awareness Zone, Causing the Radar System to Enter an Attention Mode Requiring No more than Approximately 60 mW
714

In Response to Entering the Attention Mode, and Based on a Second Subset of the Radar Data, Determining an Intention Level of the Object within the Awareness Zone
716

FIG. 8

SMARTPHONE-BASED RADAR SYSTEM FOR DETERMINING USER INTENTION IN A LOWER-POWER MODE

CROSS-REFERENCE TO RELATED APPLICATIONS

The present application is a continuation of and claims priority to U.S. patent application Ser. No. 17/035,059, filed Sep. 28, 2020, which in turn is a continuation of and claims priority to U.S. patent application Ser. No. 16/166,900, filed Oct. 22, 2018, issued as U.S. Pat. No. 10,788,880 on Sep. 29, 2020, the disclosures of which are incorporated by reference herein in their entireties.

BACKGROUND

Smartphones have become a nearly essential accessory for both business and personal life. The applications on smartphones and other electronic devices provide an ever-increasing variety of productivity, entertainment, and communication features that users interact with regularly. These devices are our almost constant companions at work, play, and home. We communicate with them via voice and touch, and treat them like a virtual assistant as we use them to schedule meetings and events, consume digital media, and share presentations and documents. In the everyday world, though, communication is more than just the words we use. A large part of how we communicate, and express our intention to communicate, is based on how we perceive and manage our interpersonal space. People often use changes of spatial relationships (such as interpersonal distance or orientation) as an implicit form of communication. For instance, we maintain certain distances from others depending on familiarity, we orient toward people when addressing them, we move closer to objects we are interested in, and we stand or sit relative to others depending on the task at hand.

With the aid of machine-learning techniques, smartphone applications and the smartphones themselves become more familiar with our routines and preferences and can provide restaurant recommendations, suggest movies, and otherwise independently communicate with us. For all their computing power and artificial intelligence, however, smartphones are still reactive communicators. That is, however "smart" a smartphone is, and however much we talk to them like they are people, the smartphone is still dependent on being activated and the user typically has to first engage the smartphone and make it aware of the user's intention to use the smartphone before actually interacting with the applications. Consequently, taking advantage of the powerful and interesting features of our applications can be inconvenient and frustrating, and we may not realize the full potential of our electronic devices and applications.

SUMMARY

This document describes techniques and systems that enable a smartphone-based radar system for determining user intention in a lower-power mode. The techniques and systems use a radar field to enable a smartphone to accurately determine the presence or absence of a user and further determine the intention of the user to interact with the smartphone. Using these techniques, the smartphone can account for the user's nonverbal communication cues to determine and maintain an awareness of users in its environment, and only respond to direct interactions once the user has demonstrated an intention to interact, which preserves battery power. The smartphone may determine the user's intention by recognizing various cues from the user, such as a change in position relative to the smartphone, a change in posture, or by an explicit action, such as a gesture.

Aspects described below include a smartphone comprising a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that can be executed by the one or more computer processors to implement a persistent radar-based interaction manager. The persistent radar-based interaction manager maintains the radar system in an idle mode that requires no more than approximately 30 milliwatts (mW) of power. The persistent radar-based interaction manager also determines, based on a first subset of the radar data, a presence of the object within an awareness zone of the smartphone. In response to determining the presence of the object within the awareness zone, the persistent radar-based interaction manager causes the radar system to enter an attention mode that requires no more than approximately 60 mW of power. In response to entering the attention mode, and based on a second subset of the radar data, the persistent radar-based interaction manager determines an intention level of the object and, based on the intention level, determines whether the object intends to interact with the smartphone. In response to determining that the intention level indicates the object does not intend to interact with the smartphone, the persistent radar-based interaction manager causes the radar system to exit the attention mode and enter the idle mode. In response to determining that the intention level indicates the user intends to interact with the smartphone, the persistent radar-based interaction manager causes the radar system to exit the attention mode and enter an interaction mode that requires no more than approximately 90 mW of power.

Aspects described below also include a method, implemented in an electronic device that includes a radar system. The method comprises providing, by the radar system, a radar field and sensing, by the radar system, reflections from an object in the radar field. The method also includes analyzing the reflections from the object in the radar field and providing, based on the analysis of the reflections, radar data. The method additionally includes maintaining the radar system in an idle mode that requires no more than approximately 30 milliwatts (mW) of power. The method also includes determining, based on a first subset of the radar data, a presence of the object within an awareness zone of the electronic device and, in response to determining the presence of the object within the awareness zone, causing the radar system to enter an attention mode that requires no more than approximately 60 mW of power. The method additionally includes, in response to entering the attention mode, and based on a second subset of the radar data, determining an intention level of the object and, based on the intention level, determining whether the object intends to interact with the electronic device. The method further includes, in response to determining that the intention level indicates the object does not intend to interact with the electronic device, causing the radar system to exit the attention mode and enter the idle mode. The method also includes, in response to determining that the intention level indicates the user intends to interact with the electronic device, causing the radar system to exit the attention mode and enter an interaction mode that requires no more than approximately 90 mW of power.

Aspects described below also include a method, implemented in an electronic device that includes a radar system. The method comprises providing, by the radar system, a radar field and sensing, by the radar system, reflections from an object in the radar field. The method also includes analyzing the reflections from the object in the radar field and providing, based on the analysis of the reflections, radar data. The method additionally includes maintaining the radar system in a lower-power mode that requires no more than approximately 30 milliwatts (mW) of power. The method also includes determining, based on a first subset of the radar data, a presence of the object within an awareness zone of the electronic device and, in response to determining the presence of the object within the awareness zone, causing the radar system to exit the lower-power mode and enter an interaction mode that requires no more than approximately 90 mW of power.

Aspects described below also include a system comprising an electronic device that includes, or is associated with, a first means. The first means is a means for providing a radar field, sensing reflections from an object in the radar field, analyzing the reflections from the object in the radar field, and providing, based on the analysis of the reflections, radar data. The system also includes a second means. The second means is a means for maintaining the first means in an idle mode that requires no more than approximately 30 milliwatts (mW) of power. The second means is also a means for determining, based on a first subset of the radar data, a presence of the object within an awareness zone of the electronic device and, in response to determining the presence of the object within the awareness zone, causing the first means to enter an attention mode that requires no more than approximately 60 mW of power. The second means is also a means for, in response to entering the attention mode, and based on a second subset of the radar data, determining an intention level of the object. The second means is also a means for determining, based on the intention level, whether the object intends to interact with the electronic device and, in response to determining that the intention level indicates the object does not intend to interact with the electronic device, causing the first means to exit the attention mode and enter the idle mode. The second means is also a means for, in response to determining that the intention level indicates the user intends to interact with the electronic device, causing the first means to exit the attention mode and enter an interaction mode that requires no more than approximately 90 mW of power.

Other aspects include a method that can be implemented in an electronic device that includes a radar system. The method comprises providing, by the radar system, a radar field and sensing, by the radar system, reflections from an object in the radar field. The method also includes analyzing the reflections from the object in the radar field and providing, based on the analysis of the reflections, radar data. The method also includes maintaining the radar system in a first power mode and determining, based on a first subset of the radar data and to a first degree of certainty, a first intention of the object to interact with the electronic device. The method additionally includes, in response to determining the first intention of the object to interact with the electronic device, causing the radar system to enter a second power mode. In response to entering the second power mode, and based on a second subset of the radar data, the method also includes determining, to a second degree of certainty, a second intention of the object to interact with the electronic device. The method further includes, responsive to determining the second intention of the object to interact with the electronic device, causing the radar system to enter a third power mode. In response to entering the third power mode, and based on a third subset of the radar data, the method also includes determining, to a third degree of certainty, a third intention of the object to interact with the electronic device.

This summary is provided to introduce simplified concepts concerning a smartphone-based radar system for determining user intention in a lower-power mode, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a smartphone-based radar system for determining user intention in a lower-power mode are described in this document with reference to the following drawings. The same numbers are used throughout the drawings to reference like features and components:

FIGS. 7-11 depict example methods enabling a smartphone-based radar system for determining user intention in a lower-power mode.

DETAILED DESCRIPTION

Overview

Figure 1:
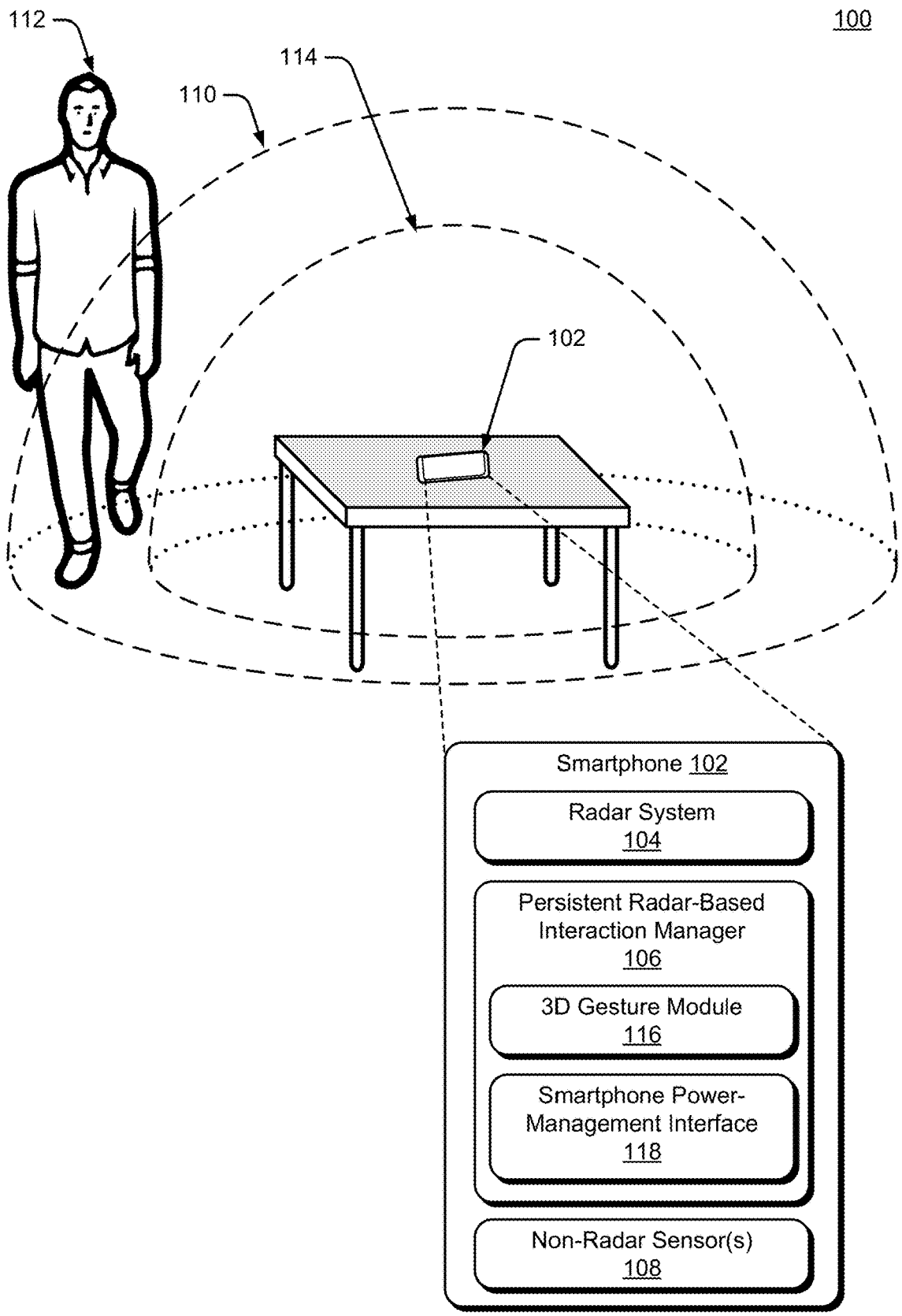
FIG. 1 illustrates an example environment in which techniques enabling a smartphone-based radar system for determining user intention in a lower-power mode can be implemented.

This document describes techniques and systems that enable a smartphone-based radar system for determining user intention in a lower-power mode. As noted, it can be difficult for an electronic device to determine a user's intention to interact with the device, which can limit its responsiveness. While the device can receive and act on direct voice or touch input, humans usually communicate intention using a mix of verbal and nonverbal communication, and current smartphones understand, at most, the verbal portion. Thus, users may not realize the full potential of their smartphone features because of limitations in recognizing nonverbal communication. The described techniques and systems employ a radar system to determine a user's intention to interact, or not interact, with the electronic device. The user's intention may be discerned by determining the user's position, the user's orientation with reference to the device, the user's posture, or other factors. These techniques enable an increased degree of refinement, an increased conformity to truth, or both the increased degree of refinement and the increased conformity to truth. Because the electronic device can determine the user's intention while preserving battery power, interactions may be more convenient and less frustrating because the electronic device can anticipate the user's intent and enter an appropriate mode or state to interact and receive input.

Additionally, the techniques and systems can enable the smartphone to receive gesture input via a natural three-dimensional (3D) gesture interaction language that can be used to extend the interaction space of the smartphone beyond the screen, which provides accessibility in more situations. A 3D gesture (e.g., a gesture that comprises one or more movements, in any direction, within a 3D space illuminated by the radar field), such as swiping or reaching can be used to interact with the smartphone without touching it. Using 3D gestures, the user can scroll through a recipe without touching the screen when hands are dirty, take a selfie from the right distance and angle without stretching or awkwardly pressing a button, or maintain focus on current tasks by enabling a quick gesture that can be used to reduce interruptions by suppressing alarms, phone calls, or notifications. Thus, the described techniques and systems can improve the quality and effectiveness of the user's experience using convenient and natural 3D gestures and thereby increase the user's efficiency, workflow, and enjoyment.

Consider a smartphone or other electronic device that includes a radar system and an interaction manager that can be used to provide a radar field near the electronic device and determine when people or other objects enter the radar field. For example, the smartphone may be placed on a table or desk by the user while the user performs other tasks. The interaction manager and radar system can operate in a persistent lower-power mode that allows the radar system to detect the presence of a user within a specified distance. When no users are present, the interaction manager can also put the smartphone in a lower-power state. The interaction manger can also determine whether the user intends to interact with the smartphone. If the interaction manager determines that the user does not intend to interact with the smartphone, the interaction manager can maintain the interaction manager and radar system in the persistent lower-power mode and maintain the smartphone in the lower-power state until the interaction manager determines that the user intends to interact with the smartphone. In this example, the interaction manager can determine whether the user intends to interact by observing the user's body posture and position, such as whether the user is looking at, turned toward, or reaching for the smartphone. The example power-saving mode can include turning off display elements, hiding message previews, hiding notifications, and so forth. When the interaction manager determines that the user intends to interact with the smartphone, the radar system and the smartphone can resume full operations to enable the user to access all of the features and functions of the smartphone.

For example, when the radar system is in the lower-power mode, the smartphone can also be in a lower-power state by turning off or otherwise reducing the power consumption of various functions such as a display, a touchscreen, a microphone, a voice assistant, and so forth. When the radar system detects the user in the area, and determines that the user intends to interact with the smartphone, the interaction manager can automatically restore the smartphone to a fully operational state. The smartphone can be presented in a ready-to-use state (e.g., the user can be automatically authenticated via a radar-based authentication system or by another method) or the smartphone can be presented ready for authentication by the user (e.g., ready to receive a password, gesture, fingerprint, or other authentication). In this way, the interaction manager can preserve power without reducing functionality for the user. Further, the user may enjoy an improved experience with the smartphone because the interaction manager anticipates the user's intentions and can present the smartphone in a customizable state that allows the user to begin interacting with the smartphone without having to pick up or touch the smartphone and then wait for the smartphone to come ready.

Some conventional electronic devices may use cameras or proximity sensors (e.g., capacitive sensors) to determine the location of the user and adjust various functions of the electronic device based on the proximity of the user. For example, the electronic device may provide additional privacy or aesthetic value by turning off a display unless the user is within a predetermined distance. The conventional electronic device, however, typically cannot distinguish between the mere presence of the user (or a non-user who just happens to be near the electronic device) and the user who intends to interact with the electronic device. Thus, the conventional electronic device uses more power and potentially provides less privacy or aesthetic value because it may turn on when the non-user is near or when the user is near, but uninterested in interaction. For example, the user may set the electronic device on the desk while talking with a guest. A previously set reminder to make a doctor's appointment may be displayed in a manner that allows the guest to see the reminder. Even a quick-acting user may experience frustration or embarrassment that the private reminder was displayed at an inopportune time. Consistently annoying or inconvenient interactions with the smartphone can reduce efficiency and the quality of the user's experience, or even reduce the likelihood that the user will use some features.

In contrast, the described systems and techniques can improve efficiency and usability in several areas while preserving battery life. For instance, in the example above, the smartphone can determine that the user is not paying attention to the smartphone (e.g., by determining that the user is turned away from the smartphone) and hide the reminder. In this way, the described techniques and systems allow efficient and natural interaction with the smartphone or other electronic devices. The user can enjoy the advantages and conveniences that smartphones provide, while the interaction manager and radar system provide additional flexibility and enhanced functionality, without excessive power consumption. This can improve efficiency and reduce user frustration by reducing the need for the user to adjust reminders, alerts, and notifications for different social settings while maintaining privacy and reducing interruptions, which can increase the quality of the user experience. Further, power consumption of the radar system and the electronic device itself can be substantially less than some conventional techniques that may use an always-on camera (or other sensors or combinations of sensors) to control some display features. These are but a few examples of how the described techniques and devices may be used to enable a smartphone-based radar system for determining user intention in a lower-power mode. Other examples and implementations of which are described throughout this document.

The document now turns to an example environment, after which example systems, apparatuses, methods, and components are described.

Operating Environment

FIG. 1 illustrates an example environment 100 in which techniques enabling a smartphone-based radar system for determining user intention in a lower-power mode can be implemented. The example environment 100 includes a smartphone 102, which includes, or is associated with, a radar system 104, a persistent radar-based interaction manager 106 (interaction manager 106), and, optionally, one or more non-radar sensors 108 (non-radar sensor 108). The non-radar sensor 108 can be any of a variety of devices, such as an audio sensor (e.g., a microphone), a touch-input sensor (e.g., a touchscreen), or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the smartphone 102, or another electronic device, to sense and analyze reflections from an object 112 in the radar field 110. Some implementations of the radar system 104 are particularly advantageous as applied in the context of smartphones, such as the smartphone 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of the smartphone for which fine radar-detected hand gestures is required, it is to be appreciated that the applicability of the features and advantages of the present invention is not necessarily so limited, and other embodiments involving other types of electronic devices may also be within the scope of the present teachings.

The object 112 may be any of a variety of objects from which the radar system 104 can sense and analyze radar reflections, such as wood, plastic, metal, fabric, a human body, or human body parts (e.g., a foot, hand, or finger of a user of the smartphone 102). As shown in FIG. 1, the object 112 is a user of the smartphone 102 (user 112). Based on the analysis of the reflections, the radar system 104 can provide radar data that includes various types of information associated with the radar field 110 and the reflections from the user 112, as described with reference to FIGS. 3-6 (e.g., the radar system 104 can pass the radar data to other entities, such as the interaction manager 106).

It should be noted that the radar data may be continuously or periodically provided over time, based on the sensed and analyzed reflections from the object 112 in the radar field 110. A position of the object 112 can change over time (e.g., the object 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The interaction manager 106 can be used to interact with or control various components of the smartphone 102 (e.g., modules, managers, systems, or interfaces). For example, the interaction manager 106 can be used to maintain the radar system 104 in an idle mode. The idle mode is a persistent lower-power radar mode that allows the radar system 104 to scan an environment external to the smartphone 102 and determine a presence of the user 112. The term "persistent," with reference to the interaction manager 106, and to the idle mode of the radar system 104, means that no user interaction is required to maintain the radar system 104 in the idle mode or to activate the interaction manager 106. In some implementations, the "persistent" state may be paused or turned off (e.g., by the user 112). In other implementations, the "persistent" state may be scheduled or otherwise managed in accordance with one or more parameters of the smartphone 102 (or other electronic device). For example, the user 112 may schedule the "persistent" state such that it is only operational during daylight hours, even though the smartphone 102 is on both at night and during the day. In another example, the user 112 may coordinate the "persistent" state with a power-saving mode of the smartphone 102.

In the idle mode, the interaction manager 106 can determine the presence of the user 112 without verbal, touch, or other input by the user. For example, while in the idle mode, the interaction manager 106 may use one or more subsets of the radar data (as described herein), provided by the radar system 104, to determine the presence of the user 112 or of other objects that may be within an awareness zone 114 of the smartphone 102. In this way, the interaction manager 106 can provide seamless power management without requiring explicit user input.

In some implementations, the idle mode requires no more than approximately 30 milliwatts (mW) of power. In other implementations, the idle mode may require a different amount of power, such as approximately two mW or approximately eight mW. Further, when the interaction manager 106 is maintaining the radar system 104 in the idle mode, the interaction manager 106 may also maintain the smartphone 102 in a lower-power state (e.g., a sleep mode or other power-saving mode). In this way, by determining whether the user 112 (or another person) is near the smartphone 102, the interaction manager can help preserve battery power by reducing power consumption when no user is near the smartphone 102.

The awareness zone 114 is a zone around the radar system 104 within which the interaction manager 106 can accurately determine the presence of the user 112. The awareness zone 114 may take any of a variety of shapes and forms. For example, the awareness zone 114 may be approximately coterminous with the radar field 110 (e.g., the shape of the radar field 110 as described, for example, with reference to FIGS. 3 and 4). In other cases, the awareness zone 114 may take a shape such as a radius extending from the radar system 104, a volume around the radar system 104 (e.g., a sphere, a hemisphere, a partial sphere, a beam, or a cone), or a non-uniform shape (e.g., to accommodate interference from obstructions in the awareness zone). The awareness zone may extend any of a variety of distances from the radar system 104 such as three, seven, ten, or fourteen feet (or one, two, three, or four meters), and may coincide with the extent of the radar field 110. In other cases, as shown in FIG. 1, the awareness zone 114 may be less than a maximum extent of the radar field 110. The awareness zone 114 may be predefined, user-selectable, or determined via another method (e.g., based on power requirements, remaining battery life, or another factor). In some implementations, when the interaction manager 106 determines the presence of the user 112 (or another object) within the awareness zone 114, the interaction manager 106 can cause the radar system 104 to exit the idle mode and enter an interaction mode, which is described in detail below.

Optionally, or in other implementations, when the interaction manager 106 determines the presence of the user 112 (or another object) within the awareness zone 114, the interaction manager 106 can cause the radar system 104 to enter an attention mode. The attention mode is a radar mode that allows the radar system 104 to provide other information about objects within the awareness zone 114. For example, while in the attention mode, the radar system 104 can provide other radar data (including one or more other subsets of the radar data, as described herein) that can be used to determine an intention level of the user 112.

In some implementations, the attention mode requires no more than approximately 60 mW of power. In other implementations, the attention mode may require a different amount of power, such as between approximately eight mW and approximately fifty-five mW or between approximately two mW and approximately twenty mW. When the interaction manager 106 is maintaining the radar system 104 in the attention mode, the interaction manager 106 may also maintain the smartphone 102 in the lower-power state that may be used with the idle mode, or the interaction manager 106 may cause the smartphone to exit the lower-power state and enter another state (e.g., a wake mode, an active mode, and so forth).

The interaction manager 106 (or another module or entity) can use the intention level to determine whether the user 112 intends to communicate or interact with the smartphone 102. The intention level can be determined from a variety of information about the user 112 (within the awareness zone 114) that can be determined based on the other radar data. The interaction manager 106 can determine the intention level of the user 112 without verbal, touch, or other input by the user. For example, the interaction manager 106 may determine the user's intention to view, communicate with, or otherwise interact with the smartphone 102 by using the other radar data, or one or more other subsets of the other radar data, to determine the body position or posture of the user 112 in relation to the smartphone 102.

The determination of the body position and posture of the user 112 may include determining one or more of a variety of different nonverbal body language cues, body positions, or body postures. The cues, positions and postures may include an absolute position or distance of the user 112 with reference to the smartphone 102, a change in the position or distance of the user 112 with reference to the smartphone 102 (e.g., whether the user 112 is moving closer to or farther from the smartphone 102), the velocity of the user 112 when moving near the smartphone 102 (e.g., whether the user 112 pauses when near the smartphone 102), whether the user 112 turns toward or away from the smartphone 102, whether the user 112 leans toward, waves toward, reaches for, or points at the smartphone 102, and so forth.

Consider an example in which the user 112 is moving toward the smartphone 102. When the user 112 does not slow down and continues past the smartphone 102, the interaction manager 106 determines that the user 112 does not intend to interact with the smartphone 102. Similarly, when the user 112 slows down, or even stops near the smartphone 102, but turns away from the smartphone 102, the interaction manager 106 also determines that the user 112 does not intend to interact with the smartphone 102. In contrast, when the user 112 stops near the smartphone 102 and is turned toward (or is reaching toward) the smartphone 102, the interaction manager 106 determines that the user 112 intends to interact with the smartphone 102. In this way, using the different body positions and postures of the user 112, the interaction manager 106 can accurately determine whether the user 112 intends to interact with the smartphone 102.

When the interaction manager 106 determines that the intention level of the user 112 indicates that the user 112 does not intend to interact with the smartphone 102, the interaction manager 106 can cause the radar system 104 to exit the attention mode and enter (or re-enter) the idle mode. When the radar system 104 enters the idle mode, the interaction manager 106 may also cause the smartphone 102 to enter a lower-power state (e.g., if the smartphone 102 is in a higher-power state while the radar system is in the attention mode). Thus, the interaction manager 106 can use the intention level of the user 112 to help manage the power consumption of the radar system 104 and, optionally, the smartphone 102.

Conversely, when the interaction manager 106 determines that the intention level of the user 112 indicates that the user 112 intends to interact with the smartphone 102, the interaction manager 106 can cause the radar system 104 to exit the attention mode and enter an interaction mode. The interaction mode is a radar mode that allows the radar system 104 to provide additional information about objects within the awareness zone 114. For example, while in the interaction mode, the radar system 104 can provide additional radar data (including one or more additional subsets of the radar data, as described herein) that can be used to enable the radar system 104 to determine 3D gestures made by the user 112 and process the 3D gestures in a way that enables the user 112 to interact with the smartphone 102 via the 3D gestures. Additional description and examples of how 3D gestures can be used to interact with the smartphone 102 are described with reference to FIGS. 10-16.

The interaction mode can also provide additional information to the user 112. Continuing the example above, in which the user 112 is moving toward the smartphone 102, assume that a display of the smartphone 102 is dimmed (e.g., because the smartphone 102 is in a lower-power state as described above). Additionally assume that the interaction manager 106 determines, based on the intention level, that the user 112 intends to interact with the smartphone 102 (e.g., because the user 112 is stopped near the smartphone 102). In response, the interaction manager 106 can cause the smartphone 102 to change a state of the display (e.g., to increase the display brightness of the current screen or change the screen to display an authentication screen or a smart assistant). In this way, the interaction manager 106 can provide the user 112 with timely access to the smartphone 102 while preserving battery power and providing increased privacy.

In some implementations, the interaction mode requires no more than approximately 90 mW of power. In other implementations, the interaction mode may require a different amount of power, such as approximately 20 mW or approximately 55 mW. Further, when the interaction manager 106 maintains the radar system 104 in the interaction mode, while the user 112 interacts with the smartphone 102, the interaction manager 106 may also maintain the smartphone 102 in an appropriate power mode (e.g., a full-power mode, the wake mode or active mode as described with reference to the attention mode, the sleep mode as described with reference to the idle mode, or another power mode). In this way, by determining whether the user 112 (or another person) intends to interact with the smartphone 102, the interaction manager can help preserve battery power by inducing an appropriate power mode for the radar system 104, and optionally for the smartphone 102, that is appropriate to the level of interaction by the user 112.

The power consumed by the radar system 104 in the idle mode, the attention mode, and the interaction mode can be adjusted using various techniques. For example, the radar system 104 can reduce power consumption by collecting radar data at different duty cycles (e.g., lower frequencies may use less power), turning various components off when the components are not active, or adjusting a power amplification level. Additional details regarding power management of the radar system 104 (and the smartphone 102) are described with reference to FIG. 3.

The interaction manager 106 can also control or communicate with the non-radar sensor 108. For example, the interaction manager 106 may maintain the non-radar sensor 108 in a non-operational state when the radar system 104 is in the idle mode. The interaction manager 106 may also cause the non-radar sensor 108 to enter an operational state when the presence of the user 112 (or another object) within the awareness zone 114 is determined and the radar system 104 enters the attention mode. In another example, the interaction manager 106 may maintain the non-radar sensor 108 in the non-operational state when the radar system 104 is in the idle mode and cause the non-radar sensor 108 to enter the operational state when the interaction manager 106 causes the radar system 104 to enter the interaction mode. In this way, by managing the operation of sensors and components that use battery power and can observe or record the user 112, the interaction manager 106 can preserve battery life, increase privacy and security, and may improve the user's experience with the smartphone 102.

In some implementations, the smartphone 102 may also include, or be associated with, one or more other modules, interfaces, or systems. As shown in FIG. 1, the smartphone 102 includes a 3D gesture module 116 and a smartphone power-management interface 118. The 3D gesture module 116 can store both information related to determining 3D gestures based on the radar data and information related to actions that correspond to the 3D gestures.

A 3D gesture can be any of a variety of gestures, including a scrolling gesture made by moving a hand above the smartphone 102 along a horizontal dimension (e.g., from a left side of the smartphone 102 to a right side of the smartphone 102), a waving gesture made by the user's arm rotating about an elbow, a pushing gesture made by moving the user's hand above the smartphone 102 along a vertical dimension (e.g., from a bottom side of the smartphone 102 to a top side of the smartphone 102). Other types of 3D gestures or motions may also be made, such as a reaching gesture made by moving the user's hand towards the smartphone 102, a knob-turning gesture made by curling fingers of the user's hand to grip an imaginary door knob and rotating in a clockwise or counter-clockwise fashion to mimic an action of turning the imaginary door knob, and a spindle-twisting gesture made by rubbing a thumb and at least one other finger together. Each of these example gesture types may be detected by the radar system 104.

Based on the radar data, the interaction manager 106 can detect the 3D gesture by the user 112 and determine (e.g., using the 3D gesture module 116) that the gesture corresponds to a particular action of or by the smartphone 102. The particular action may be any of a variety of actions, such as activate one or more sensors (e.g., the non-radar sensor 108), interact with an application (e.g., browse for, select, or open the application), control a user interface for a media player or another application, frame and take a photograph, interact with reminders or notifications, or manage a phone call. In this way, the radar system 104 can provide touch-free control of the smartphone 102. Exemplary 3D gestures and corresponding actions are described below with reference to FIGS. 10-16.

As described with reference to FIGS. 3-6, the radar system 104 can use the radar field 110 to sense and analyze reflections from objects in the radar field 110 in ways that enable high resolution and accuracy for both gesture recognition and body posture. Thus, the 3D gesture may be any of a variety of types of 3D gestures, such as an arm gesture, a hand or finger gesture, a micro-gesture, or another type of gesture. Further, 3D gestures may be predefined, selected from a list, or customized (e.g., the user may interact with the interaction manager 106 and the radar system 104 to define unique gestures, or combination of gestures, as corresponding to particular actions).

The smartphone power-management interface 118 provides a communication link between the smartphone 102 and the interaction manager 106. In some implementations, the smartphone power-management interface 118 also acts as a communication link between a power manager 320 (described in more detail with reference to FIG. 3) and the interaction manager 106. Using the smartphone power-management interface 118, the interaction manager 106 can send and receive updates related to any of a variety of power-related features of the smartphone 102 (e.g., a power state, a battery capacity, or a remaining battery level). The smartphone power-management interface 118 also enables the interaction manager 106 to send and receive control signals to the smartphone 102 that can be used to adjust, control, manage, or modify the power-related features (e.g., enter a lower-power state, exit a sleep mode, and so forth). For example, as described above, when the interaction manager 106 is maintaining the radar system 104 in the idle mode, the attention mode, or the interaction mode, the interaction manager 106 may also maintain the smartphone 102 in an appropriate power mode (e.g., a sleep mode, a wake mode, or another power-level mode) that is related to the radar system 104 mode. The interaction manager 106 may use the smartphone power-management interface 118 to perform these functions. Further, in some implementations, the smartphone power-management interface 118 may also be used to maintain the non-radar sensor 108 in the non-operational state as described above.

As shown in FIG. 1, the 3D gesture module 116 and the smartphone power-management interface 118 are depicted as part of the interaction manager 106. In other implementations, however, either or both of the 3D gesture module 116 and the smartphone power-management interface 118 may be a separate entity that can be part of, or separate from, the smartphone 102.

Figure 2:
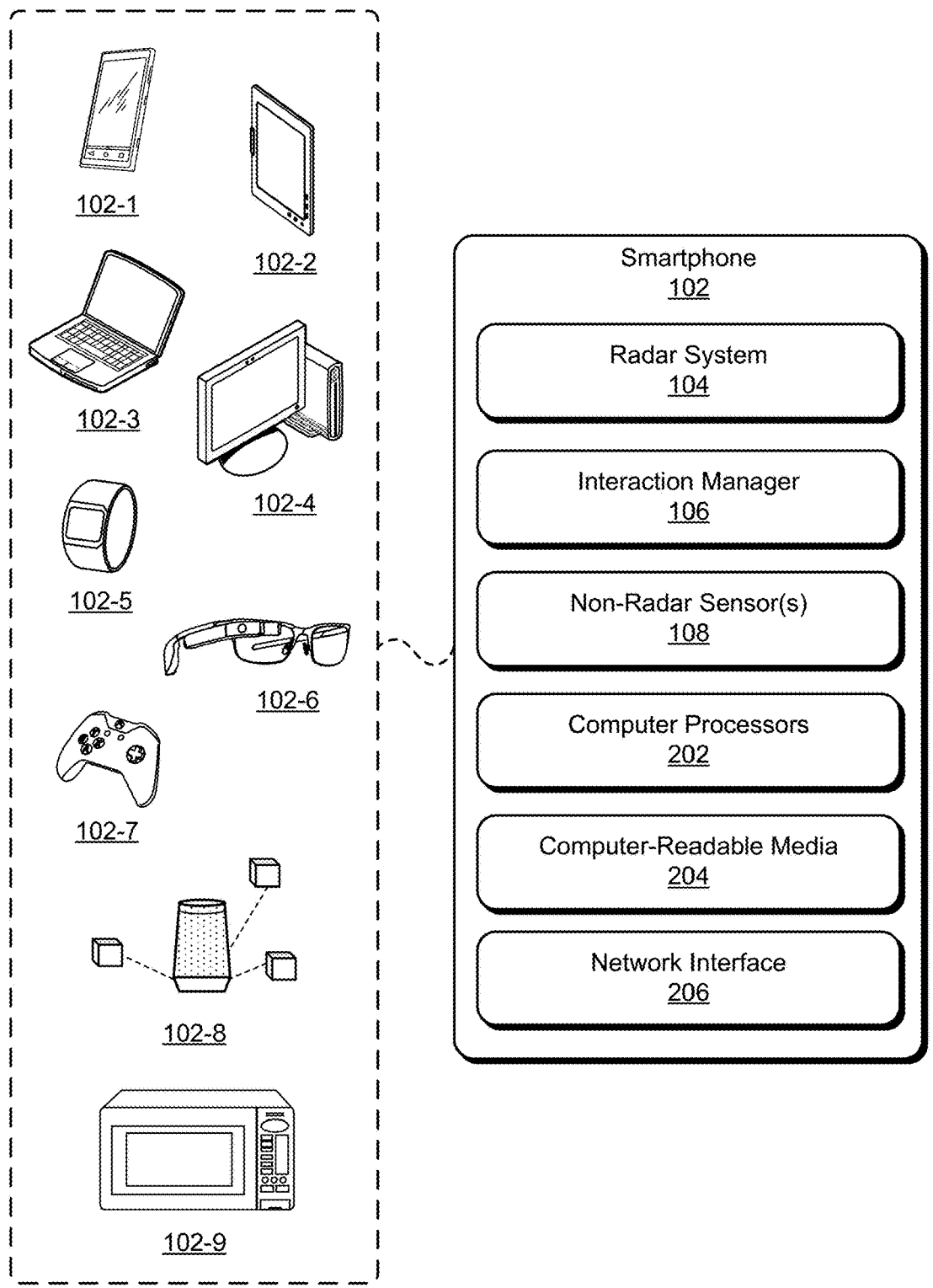
FIG. 2 illustrates an example implementation of the smartphone of FIG. 1 that includes a radar system and can implement a smartphone-based radar system for determining user intention in a lower-power mode.

In more detail, consider FIG. 2, which illustrates an example implementation 200 of the smartphone 102 (including the radar system 104, the interaction manager 106, and the non-radar sensor 108) that can implement a smartphone-based radar system for determining user intention in a lower-power mode. The smartphone 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The smartphone 102 can also include other devices, such as televisions, entertainment systems, audio systems, automobiles, drones, track pads, drawing pads, netbooks, e-readers, home security systems, and other home appliances. Note that the smartphone 102 can be wearable, non-wearable but mobile, or relatively immobile (e.g., desktops and appliances).

It should be noted that exemplary overall lateral dimensions of the smartphone 102 can be, for example, approximately eight centimeters by approximately fifteen centimeters. Exemplary footprints of the radar system 104 can be even more limited, such as approximately four millimeters by six millimeters with antennas included. The requirement of such a limited footprint for the radar system 104, which is needed to accommodate the many other desirable features of the smartphone 102 in such a space-limited package (e.g., a fingerprint sensor, the non-radar sensor 108, and so forth) combined with power and processing limitations, can lead to compromises in the accuracy and efficacy of radar gesture detection, at least some of which can be overcome in view of the teachings herein.

The smartphone 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. The smartphone 102 may also include a network interface 206. The smartphone 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. Constraints or limitations of the smartphone 102, however, may impact a design of the radar system 104. The smartphone 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the interaction manager 106 are illustrated as part of the smartphone 102. In other implementations, either or both of the radar system 104 and the interaction manager 106 may be separate or remote from the smartphone 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 18 illustrate some of many possible environments and devices capable of employing the described techniques. FIGS. 3-6 describe additional details and features of the radar system 104. In FIGS. 3-6, the radar system 104 is described in the context of the smartphone 102, but as noted above, the applicability of the features and advantages of the described systems and techniques are not necessarily so limited, and other embodiments involving other types of electronic devices may also be within the scope of the present teachings.

Figure 3:
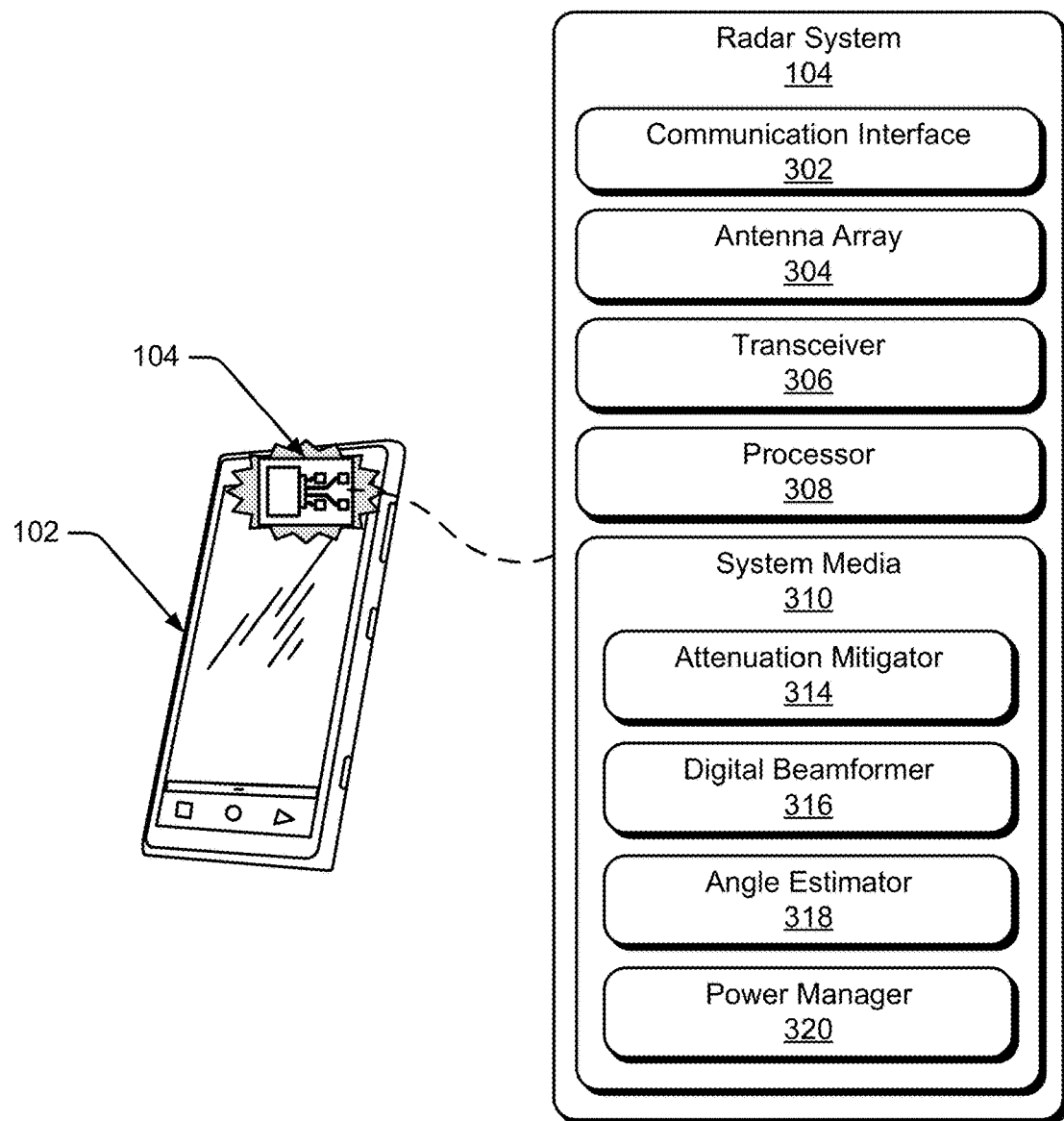
FIG. 3 illustrates an example implementation of the radar system of FIG. 2.

FIG. 3 illustrates an example implementation 300 of the radar system 104 that can be used to enable a smartphone-based radar system for determining user intention in a lower-power mode. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the smartphone 102) or some combination thereof. The system media 310, which may be included within, or be separate from, the computer-readable media 204 of the smartphone 102, includes one or more of the following modules: an attenuation mitigator 314, a digital beamformer 316, an angle estimator 318, or a power manager 320. These modules can compensate for, or mitigate the effects of, integrating the radar system 104 within the smartphone 102, thereby enabling the radar system 104 to recognize small or complex gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the interaction manager 106. The communication interface 302 may be a wireless or wired interface based on the radar system 104 being implemented separate from, or integrated within, the smartphone 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the interaction manager 106 for a smartphone-based radar system for determining user intention in a lower-power mode.

Figure 4:
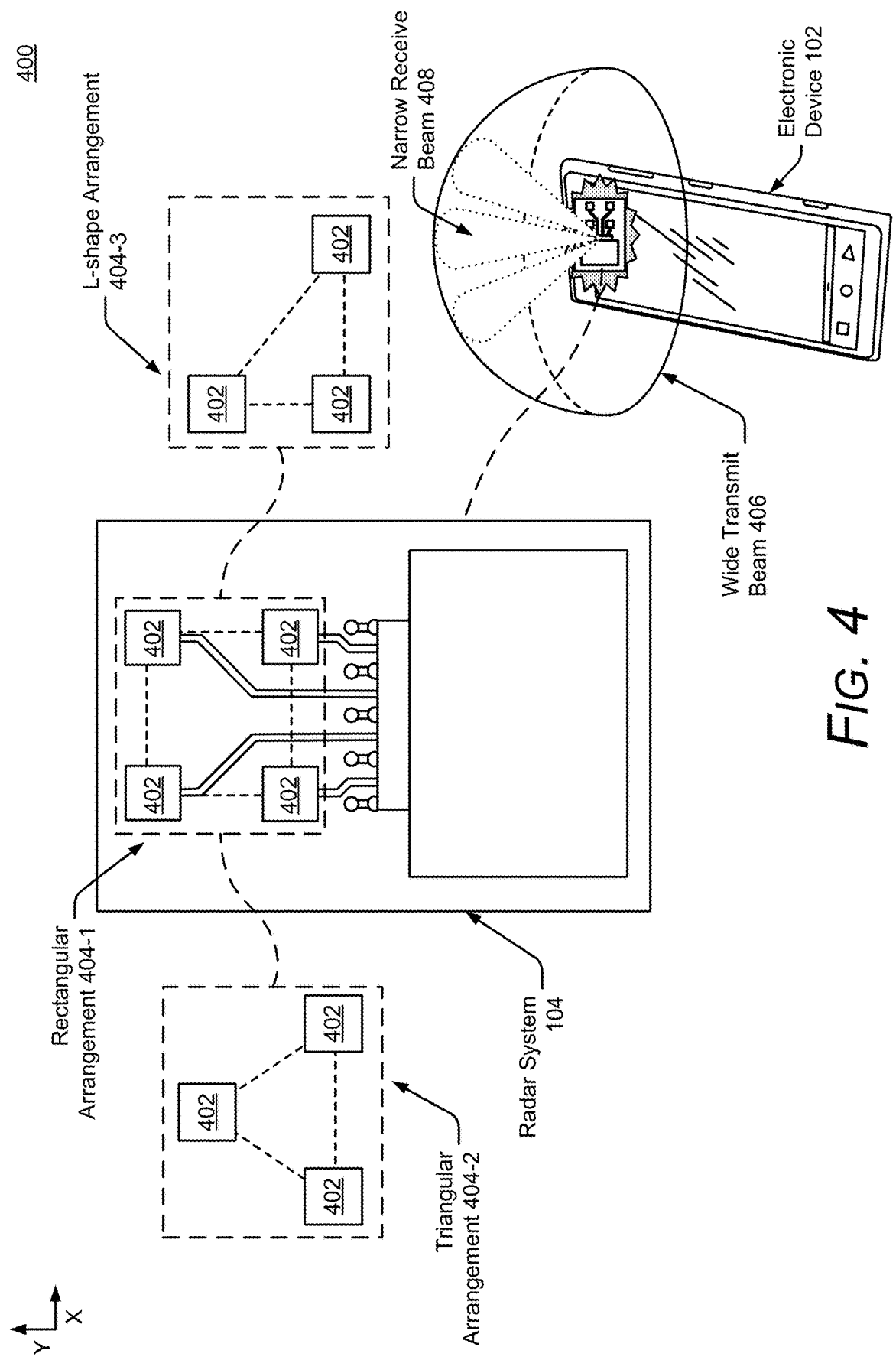
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the smartphone 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e g, azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the smartphone 102. In some implementations, the power manager 320 communicates with the interaction manager 106 or the smartphone power-management interface 118 to conserve power within either or both of the radar system 104 or the smartphone 102. Internally, for example, the power manager 320 can cause the radar system 104 to collect data using a predefined power mode or a specific duty cycle. In this case, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the smartphone 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher power mode.

The lower-power mode, for example, may use a lower duty cycle on the order of a few hertz (e.g., approximately 1 Hz or less than 5 Hz), which reduces power consumption to a few milliwatts (mW) (e.g., between approximately 2 mW and 8 mW). The higher-power mode, on the other hand, may use a higher duty cycle on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the smartphone 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the interaction manager 106 (e.g., for implementing the attention mode or the interaction mode, gesture recognition or user orientation).

In addition to the internal power-saving techniques described above, the power manager 320 can also conserve power within the smartphone 102 by activating or deactivating other external components or sensors that are within the smartphone 102. These external components may include speakers, a camera sensor, a global positioning system, a wireless communication transceiver, a display, a gyroscope, or an accelerometer. Because the radar system 104 can monitor the environment using a small amount of power, the power manager 320 can appropriately turn these external components on or off based on where the user is located or what the user is doing. In this way, the smartphone 102 can seamlessly respond to the user and conserve power without the use of automatic shut-off timers or the user physically touching or verbally controlling the smartphone 102. The described power management techniques can thus be used to provide various implementations of the idle mode, the attention mode, and the interaction mode, as described herein.

Figure 5:
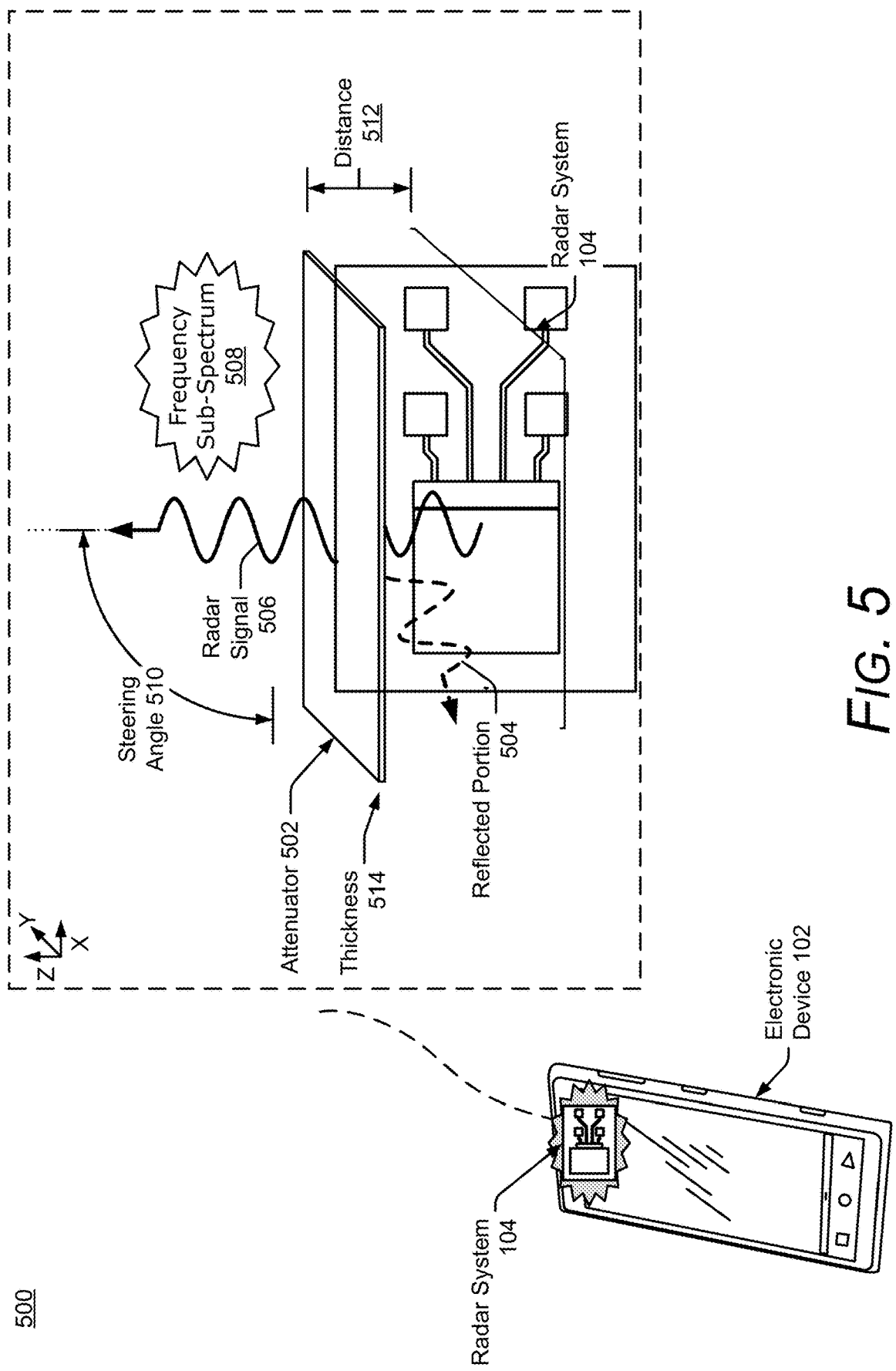
FIG. 5 illustrates additional details of an example implementation of the radar system of FIG. 2.

FIG. 5 illustrates additional details of an example implementation 500 of the radar system 104 within the smartphone 102. In the example 500, the antenna array 304 is positioned underneath an exterior housing of the smartphone 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the smartphone 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the smartphone 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
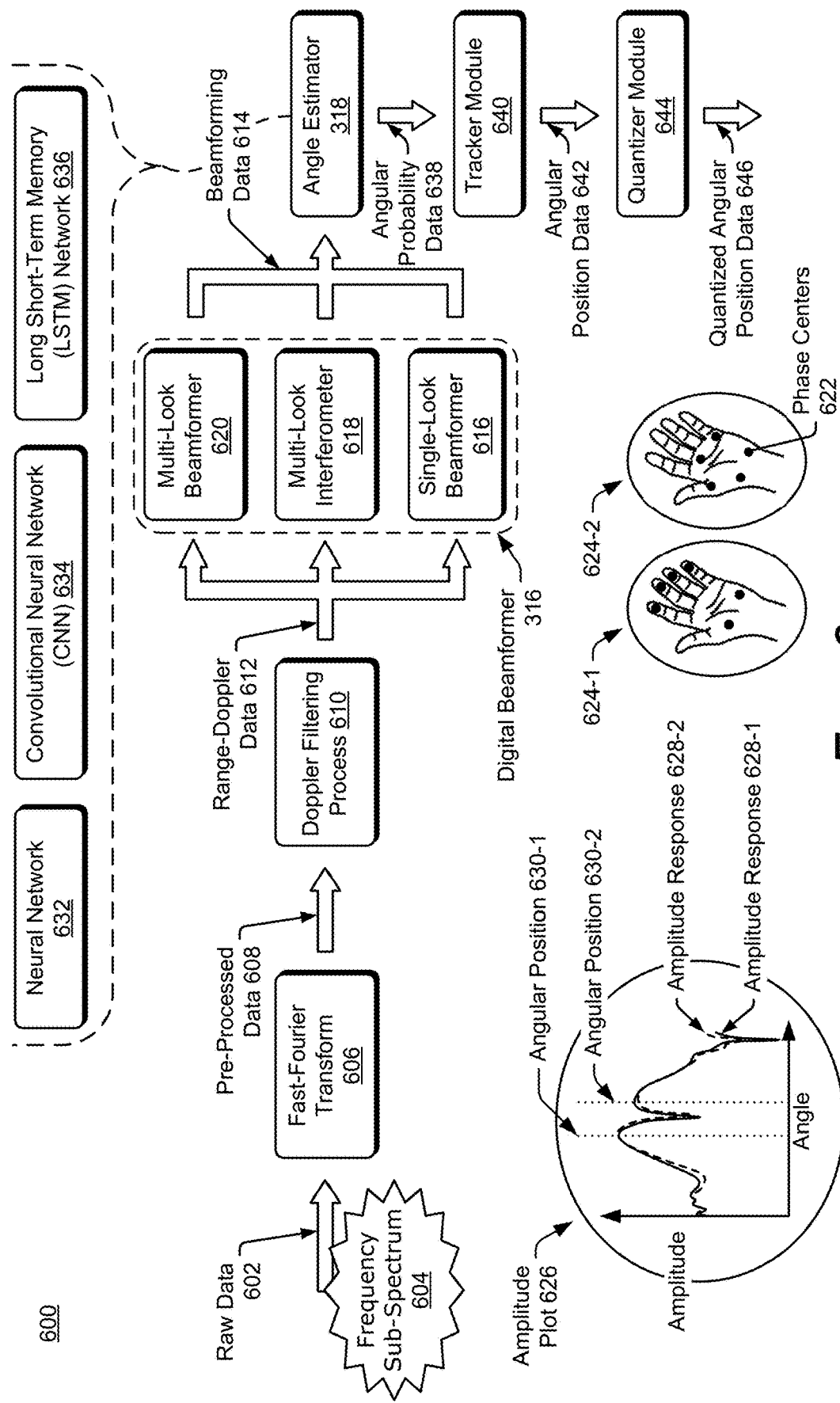
FIG. 6 illustrates an example scheme that can be implemented by the radar system of FIG. 2.
Figure 7:
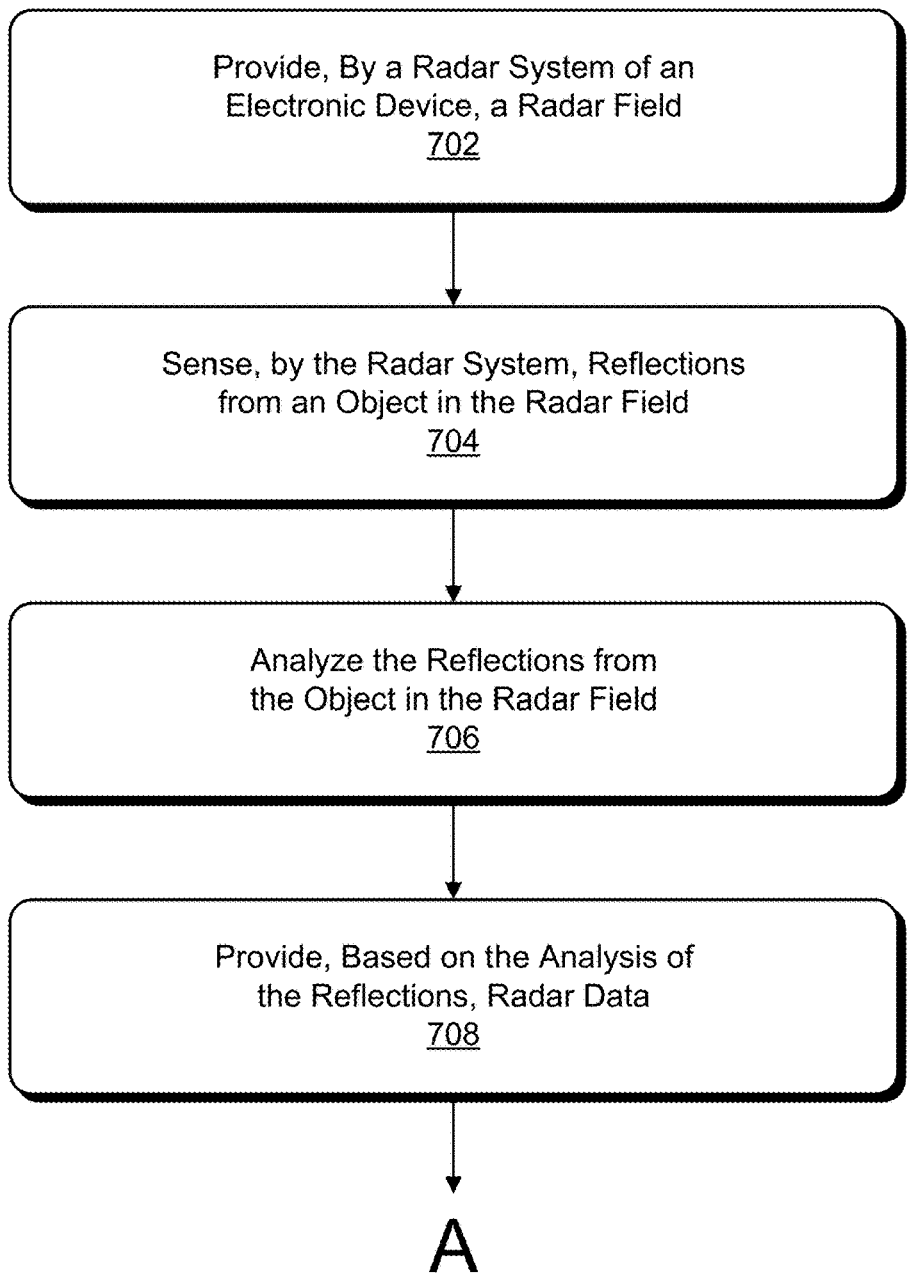
Figure 9:
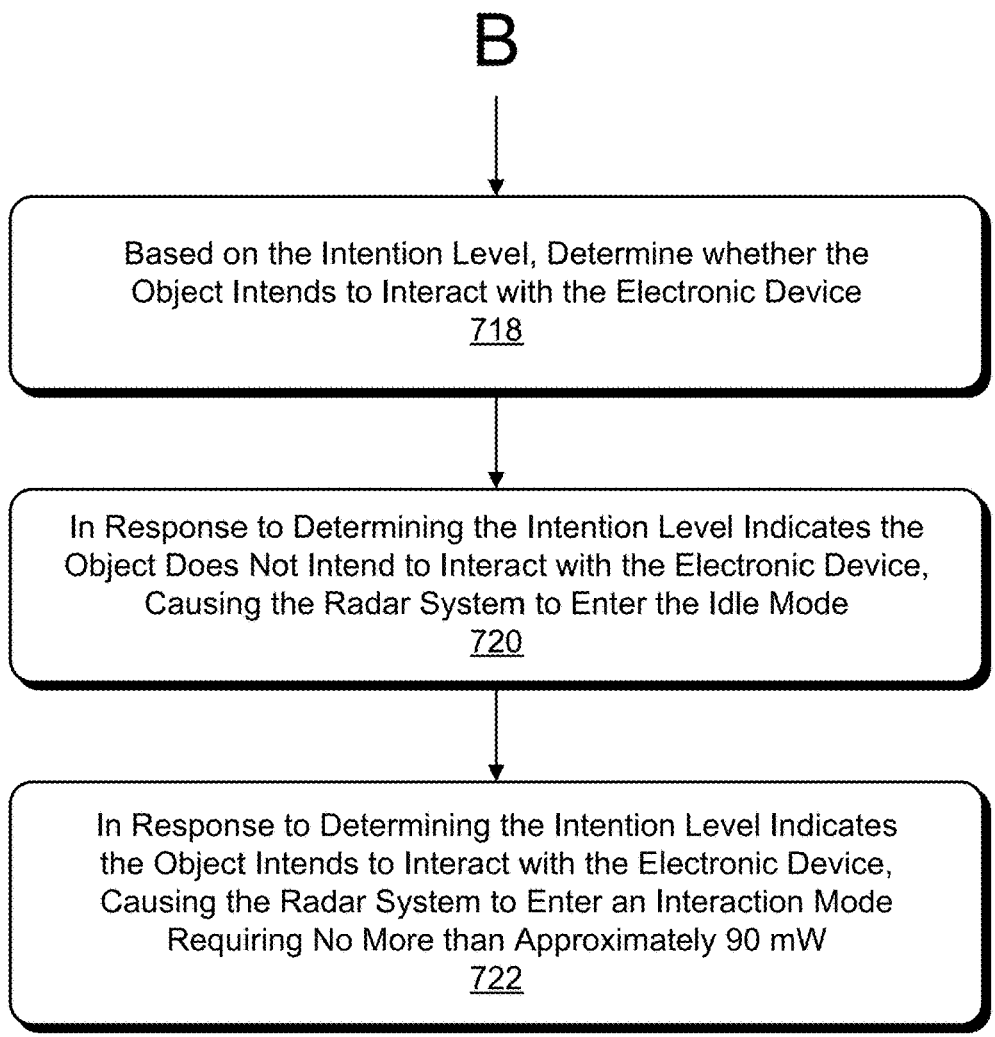
Figure 10:
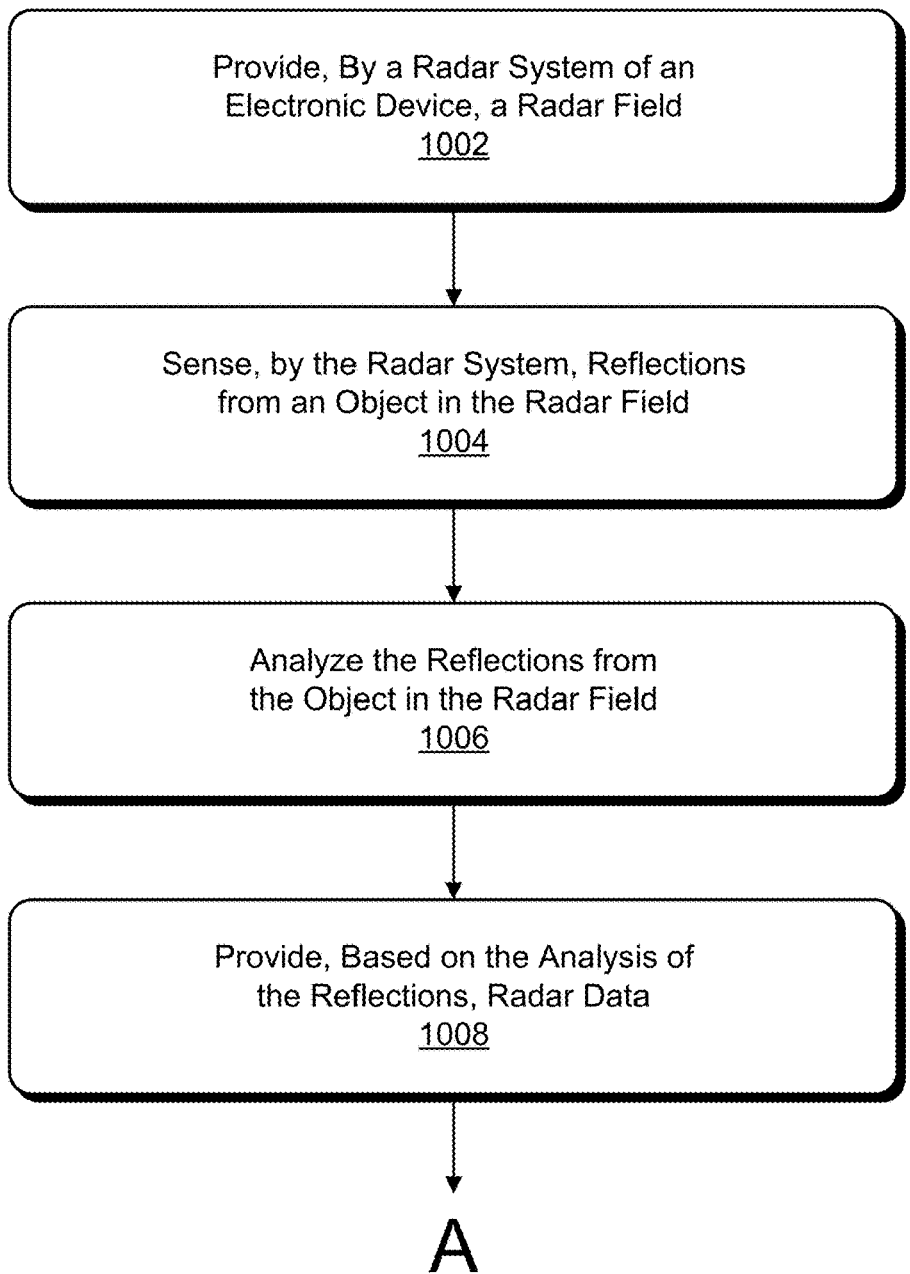
Figure 11:
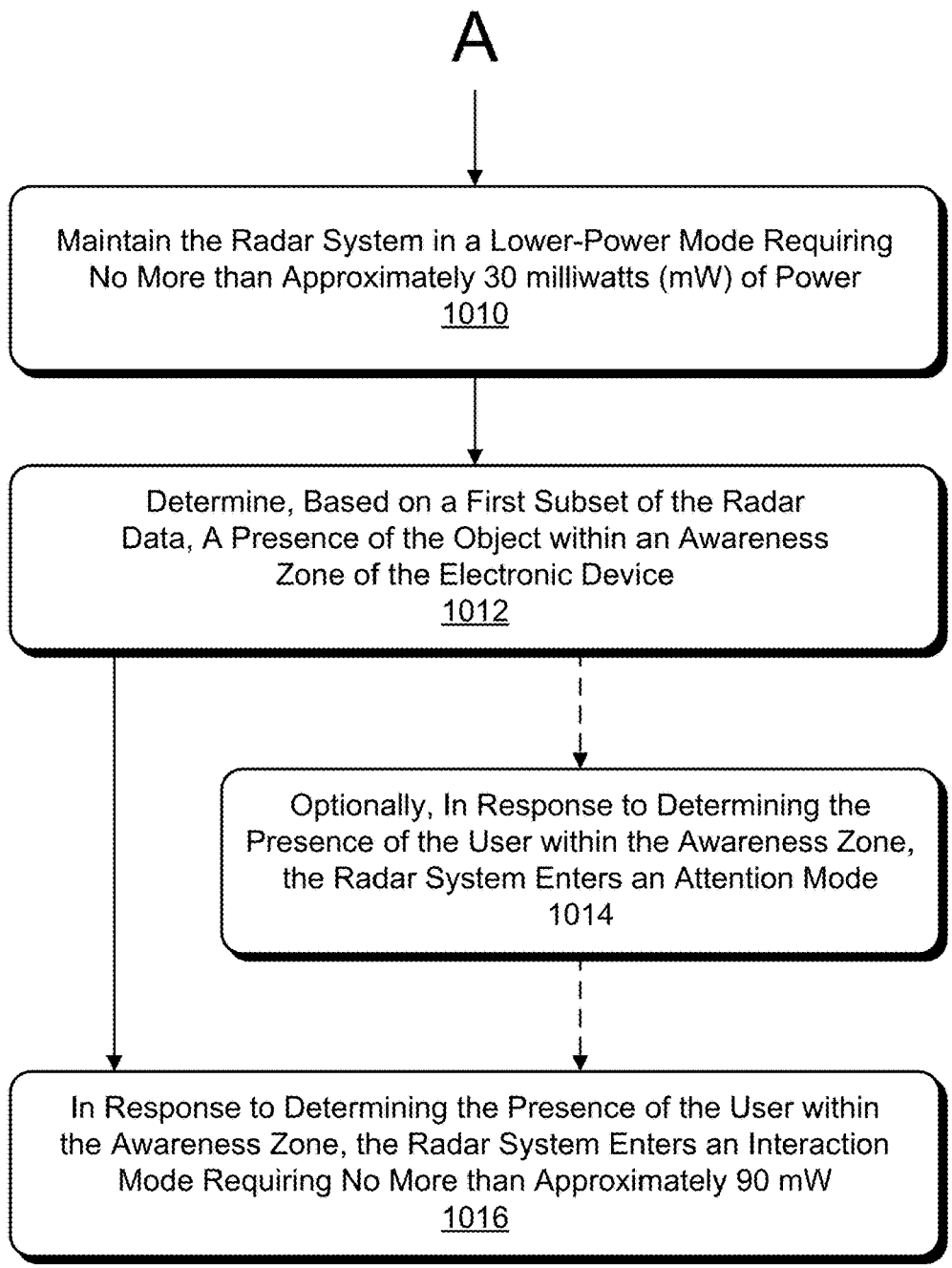

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the interaction manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of smartphone 102 (e.g., computational capability or power constraints) or a target angular resolution for the interaction manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the smartphone 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the interaction manager 106. In some situations, fewer quantization levels can be used such that the quantized angular position data 646 indicates whether the target is to the right or to the left of the smartphone 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the attention mode or the interaction mode as described herein. In some implementations, the digital beamformer 316, the angle estimator 318, the tracker module 640, and the quantizer module 644 are together implemented in a single machine learning module.

These and other capabilities and configurations, as well as ways in which entities of FIG. 1-6 act and interact, are set forth below. The described entities may be further divided, combined, used along with other sensors or components, and so on. In this way, different implementations of the smartphone 102, with different configurations of the radar system 104 and non-radar sensors, can be used to implement a smartphone-based radar system for determining user intention in a lower-power mode. The example operating environment 100 of FIG. 1 and the detailed illustrations of FIGS. 2-6 illustrate but some of many possible environments and devices capable of employing the described techniques.

Example Methods

FIGS. 7-11 depict example methods 700 and 1000, which enable a smartphone-based radar system for determining user intention in a lower-power mode. The methods 700 and 1000 can be performed with an electronic device that uses a radar system to provide a radar field. The radar field is used to determine a presence of an object in the radar field. The radar field can also be used to determine an intention level of the object, and the intention level can be used to determine whether the object intends to interact with the electronic device. Based on the determination of the object's intention, the electronic device can enter and exit different modes of functionality and power usage.

The method 700 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 702, a radar field is provided. This radar field can be provided by any of a variety of electronic devices (e.g., the smartphone 102 described above), that include, or are associated with, a radar system (e.g., the radar system 104) and an interaction manager (e.g., the interaction manager 106, which may also include either or both of the 3D gesture module 116 and the smartphone power-management interface 118). Further, the radar field may be any of a variety of types of radar fields, such as the radar field 110 described above.

At 704, reflections from an object in the radar field are sensed by the radar system. The object may be any of a variety of objects, such as wood, plastic, metal, fabric, or organic material (e.g., a person, such as the object 112 described above, or a body part of a person). For clarity, the object will be referred to as "the user" or "users" while describing the method 700.

At 706, the reflections from the object in the radar field are analyzed. The analysis may be performed by any of a variety of entities (e.g., the radar system 104, the interaction manager 106, or another entity) and may include various operations or determinations, such as those described with reference to FIGS. 3-6.

At 708, based on the analysis of the reflections, radar data is provided (e.g., the radar data described with reference to FIGS. 1-6). The radar data may be provided by any of a variety of entities, such as the radar system 104, the interaction manager 106, or another entity. In some implementations, the radar system may provide the radar data and pass the radar data to other entities (e.g., any of the described radar-based applications, interaction managers, or modules). The description of the method 700 continues in FIG. 8, as indicated by the letter "A" after block 708 of FIG. 7, which corresponds to the letter "A" before block 710 of FIG. 8.

At 710, the radar system is maintained (e.g., by the interaction manager) in an idle mode. As noted with reference to FIG. 1, the idle mode can be a lower-power radar mode that requires no more than 30 milliwatts (mW) of power. In some implementations, the idle mode may require a different amount of power, such as approximately two mW or approximately eight mW. Further, when the radar system is maintained in the idle mode, the interaction manager may also maintain the electronic device in a lower-power state (e.g., a sleep mode or other power-saving mode).

At 712, based on a subset of the radar data, a presence of the user within an awareness zone of the electronic device is determined. The awareness zone is a zone around the radar system within which the user's presence can be accurately determined without verbal, touch, or other input by the user (e.g., the awareness zone 114). As noted with reference to FIG. 1, the awareness zone may extend any of a variety of distances from the radar system. The presence of the user within the awareness zone may be determined by any of a variety of entities, such as the interaction manager.

At 714, in response to the determination of the user within the awareness zone, the radar system can enter an attention mode. The radar system may be entered into the attention mode by the interaction manager or by another entity. The attention mode is a radar mode that allows the radar system to provide other information about objects within the awareness zone, such as the user. As noted with reference to FIG. 1, the attention mode may require no more than approximately 60 mW of power. In other implementations, the attention mode may require a different amount of power, such as between approximately eight mW and approximately fifty-five mW or between approximately 2 mW and approximately 20 mW. Further, when the radar system is maintained in the attention mode, the electronic device may be maintained in the lower-power state that may be used with the idle mode, or the electronic device may exit the lower-power state and enter another power state (e.g., a wake mode, an active mode, and so forth).

At 716, in response to the electronic device entering the attention mode, and based on another subset of the radar data, an intention level of the user within the awareness zone is determined. The intention level can be determined from a variety of information about the user within the awareness zone that can be determined based on the other subset of the radar data. For example, while in the attention mode, the radar system can provide other radar data (including one or more other subsets of the radar data) that can be used to determine either or both of the body position or posture of the user in relation to the electronic device (including changes in the user's body position or posture), as described with reference to FIG. 1. The description of the method 700 continues in FIG. 9, as indicated by the letter "B" after block 716 of FIG. 7, which corresponds to the letter "B" before block 718 of FIG. 9.

At 718, based on the intention level, it is determined whether the user intends to interact with the electronic device. For example, as described with reference to FIG. 1, the interaction manager (or another module or entity) can use the intention level (including one or more of a variety of different nonverbal body language cues, body positions, or body postures), to determine whether the user intends to communicate or interact with the electronic device or whether the user does not intend to communicate or interact with the electronic device.

At 720, in response to the determining that the intention level indicates the user does not intend to interact with the electronic device, the radar system can exit the attention mode and enter the idle mode. The mode of the radar system may be changed by the interaction manager or by another entity. As noted with reference to FIG. 1, when the radar system enters (or re-enters) the idle mode, the electronic device may also enter a lower-power state. Note that the attention mode described in blocks 714-720 is optional. In some implementations, when the presence of the user within the awareness zone of the electronic device is determined (e.g., at block 712), the radar system may exit the idle mode and enter the interaction mode without entering the attention mode, as described below.

At 722, in response to determining that the intention level indicates the user intends to interact with the electronic device, the radar system may exit the attention mode and enter an interaction mode. As noted with reference to FIG. 1, the interaction mode may require no more than approximately 90 mW of power. In other implementations, the interaction mode may require a different amount of power, such as approximately 55 mW or approximately 20 mW. Further, when the radar system is maintained in the interaction mode (e.g., while the user interacts with the electronic device), the electronic device may exit the lower-power state and be maintained in another appropriate power mode, as described with reference to FIG. 1. The radar system may be entered into the interaction mode by the interaction manager or by another entity.

The interaction mode is a radar mode that allows the radar system to provide additional information about the user (or other objects) within the awareness zone. For example, while in the interaction mode, the radar system can provide additional radar data (including one or more additional subsets of the radar data, as described herein) that can be used to enable the radar system to determine 3D gestures made by the user and process the 3D gestures in a way that enables the user to interact with the smartphone 102 via the 3D gestures. For example, as described with reference to FIGS. 3-6, the radar system can use the radar field to sense and analyze reflections from objects in the radar field in ways that enable high resolution and accuracy for both 3D gesture recognition and for determining body position and posture.

The method 1000 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-9, reference to which is made for example only. The techniques are not limited to performance by one entity or multiple entities operating on one device.

At 1002, a radar field is provided. This radar field can be provided by any of a variety of electronic devices (e.g., electronic devices similar to those described with reference to the method 700 at block 702).

At 1004, reflections from an object in the radar field are sensed by the radar system (e.g., in a manner similar to that described with reference to the method 700 at block 704). For clarity, the object will be referred to as "the user" or "users" while describing the method 1000.

At 1006, the reflections from the object in the radar field are analyzed. The analysis may be performed by any of a variety of entities (e.g., as described with reference to the method 700 at block 706).

At 1008, based on the analysis of the reflections, radar data is provided (e.g., as described with reference to the method 700 at block 708). The description of the method 1000 continues in FIG. 11, as indicated by the letter "A" after block 1008 of FIG. 10, which corresponds to the letter "A" before block 1010 of FIG. 11.

At 1010, the radar system is maintained (e.g., by the interaction manager) in a lower-power mode. The lower-power mode may be the idle mode or the attention mode, as described above, or another lower-power mode. In some implementations, the lower-power mode requires no more than approximately 30 mW of power (e.g., when the lower-power mode is the idle mode). In other implementations, the lower-power mode requires no more than approximately 60 mW of power (e.g., when the lower-power mode is the attention mode). Further, when the radar system is maintained in the lower-power mode, the interaction manager may also maintain the electronic device in a lower-power state (e.g., a sleep mode or other power-saving mode).

At 1012, based on a subset of the radar data, a presence of the user within an awareness zone of the electronic device is determined (e.g., the awareness zone described with reference to the method 700 at block 712).

Optionally, at 1014, in response to the determination of the user within the awareness zone, the radar system can enter an attention mode. The radar system may be entered into the attention mode by the interaction manager or by another entity. The attention mode may be a radar mode that allows the radar system to provide other information about objects near the electronic device (e.g., within the awareness zone), such as the user. In some cases, the attention mode may require no more than approximately 60 mW of power. In other implementations, the attention mode may require a different amount of power, such as between approximately eight mW and approximately fifty-five mW or between approximately 2 mW and approximately 20 mW. Further, when the radar system is maintained in the attention mode, the electronic device may be maintained in the lower-power state that may be used with the idle mode, or the electronic device may exit the lower-power state and enter another power state (e.g., a wake mode, an active mode, and so forth). Further, in some implementations, an intention level of the user within the awareness zone is determined and, based on the intention level, it is determined whether the user intends to interact with the electronic device (e.g., as described with reference to the method 700 at blocks 716 and 718). In response to the determining that the intention level indicates the user does not intend to interact with the electronic device, the radar system can exit the attention mode and enter the idle mode (e.g., as described with reference to the method 700 at block 720).

At 1016, in response to determining the presence of the user within the awareness zone, the radar system may exit the idle mode and enter an interaction mode. As noted with reference to FIG. 1, the interaction mode may require no more than approximately 90 mW of power. In other implementations, the interaction mode may require a different amount of power, such as approximately 55 mW or approximately 20 mW. Further, when the radar system is maintained in the interaction mode (e.g., while the user interacts with the electronic device), the electronic device may exit the lower-power state and be maintained in another appropriate power mode, as described with reference to FIG. 1. The radar system may be entered into the interaction mode by the interaction manager or by another entity.

Figure 12:
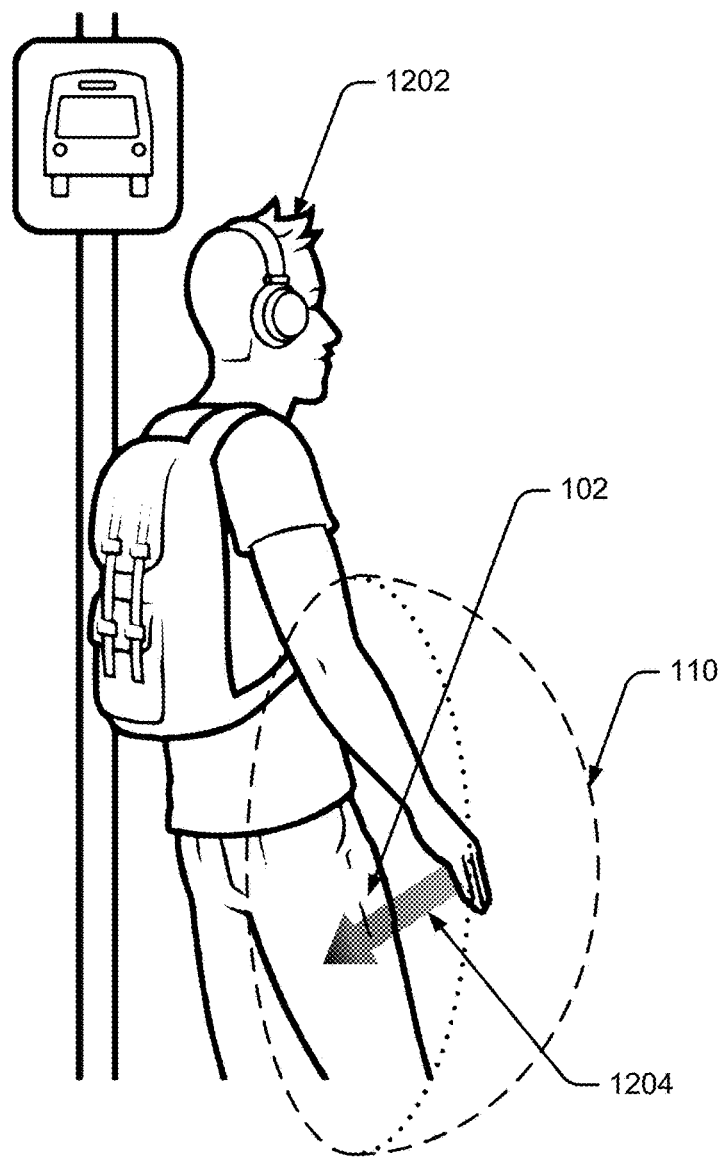
FIGS. 12-18 illustrate example implementations of an electronic device that can implement additional details of the method of FIGS. 7-11.

Consider, for example, FIG. 12 through FIG. 18, which illustrate example implementations of electronic devices that can implement additional details of the method 700. FIG. 12 depicts an example implementation 1200 of the electronic device (in this case, the smartphone 102, which is in a pocket of a user 1202, who is listening to music with an application on the smartphone 102). The smartphone 102 includes the radar system 104, which is providing the radar field 110. In the example implementation 1200, assume that the interaction manager has determined that the user 1202 intends to interact with the smartphone 102 (e.g., by determining that the user 102 leaned down toward the smartphone 102). In response, the interaction manager is maintaining the radar system in the interaction mode, so that the user 1202 can interact with the smartphone 102. For example, as shown in FIG. 12, the user 1202 is interacting with the smartphone 102 by making a swiping gesture, shown by an arrow 1204. The swiping gesture can cause the music application on the smartphone 102 to skip to the next track.

Other 3D gestures can be used to control other features or applications. For example, a set of 3D gestures can control a playback experience for multimedia applications (e.g., music, video, presentation or collaboration applications, and games) from a distance. The other 3D gestures may include an air tap for play/pause, a swipe up or down to adjust volume, a pinch gesture to copy and paste text, or a rotation gesture to select new content. The same types of 3D gestures can be used in a "cast" context. For example, if the user is casting content to another device (e.g., a large-screen television), from the smartphone 102 (or another device) the user can control the media experience on the other device with 3D gestures via the smartphone 102 in the interaction mode.

Figure 13:
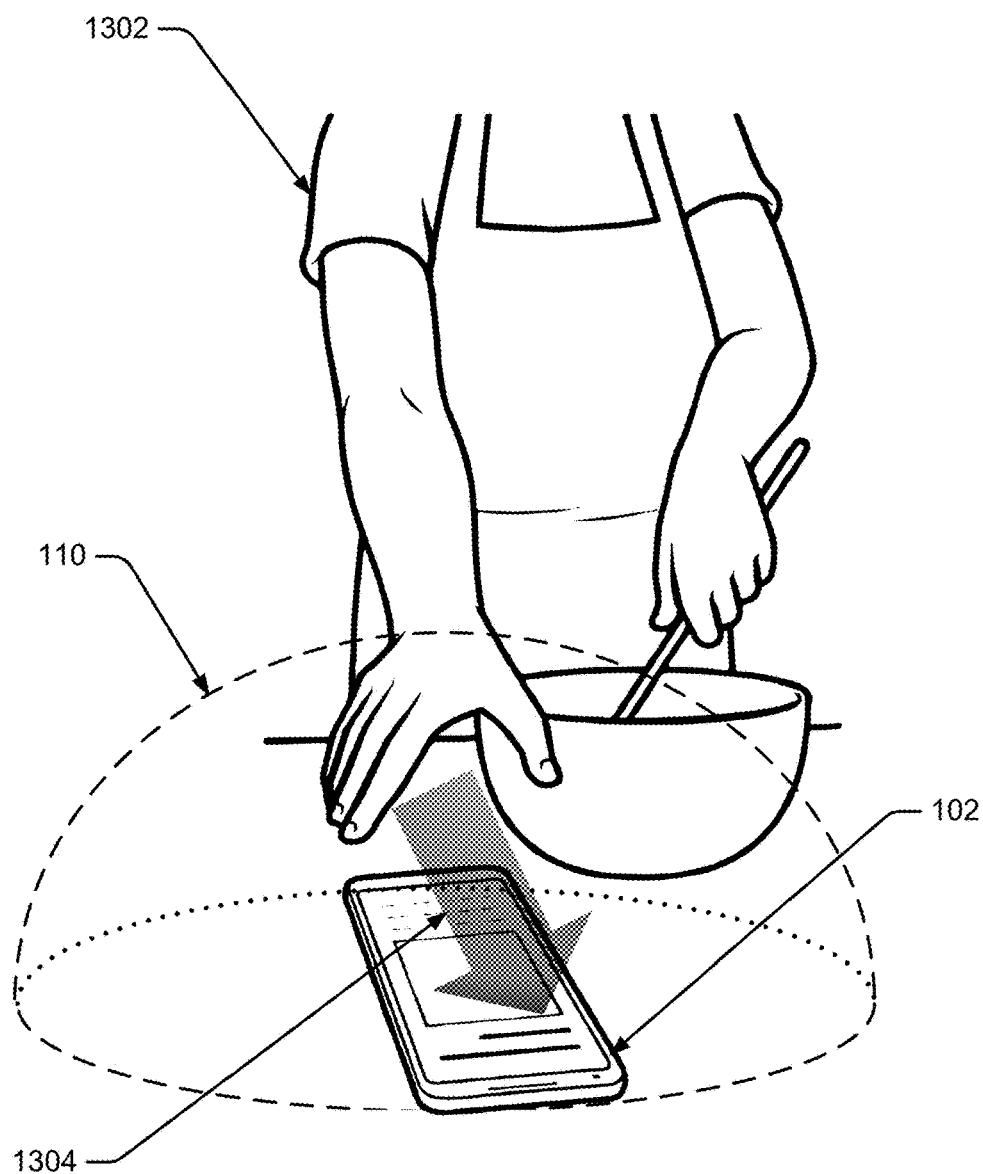

Similarly, FIG. 13 depicts an example implementation 1300 of the electronic device (in this case, the smartphone 102, which is on a table near a user 1302). The smartphone 102 includes the radar system 104, which is providing the radar field 110. In the example implementation 1300, assume that the user 1302 is mixing wet ingredients in a bowl according to a recipe displayed on the smartphone 102 and that both of the user's hands are covered with the wet ingredients. Further assume that the interaction manager has determined that the user 1302 intends to interact with the smartphone 102 (e.g., by determining that the user 1302 leaned and reached toward the smartphone 102). In response, the interaction manager is maintaining the radar system in the interaction mode, so that the user 1302 can interact with the smartphone 102. For example, as shown in FIG. 13, the user 1302 is interacting with the smartphone 102 by making a reaching gesture, shown by an arrow 1304. The reaching gesture can cause the smartphone 102 to scroll or advance the displayed recipe so that the user 1302 can read the next steps.

Figure 14:
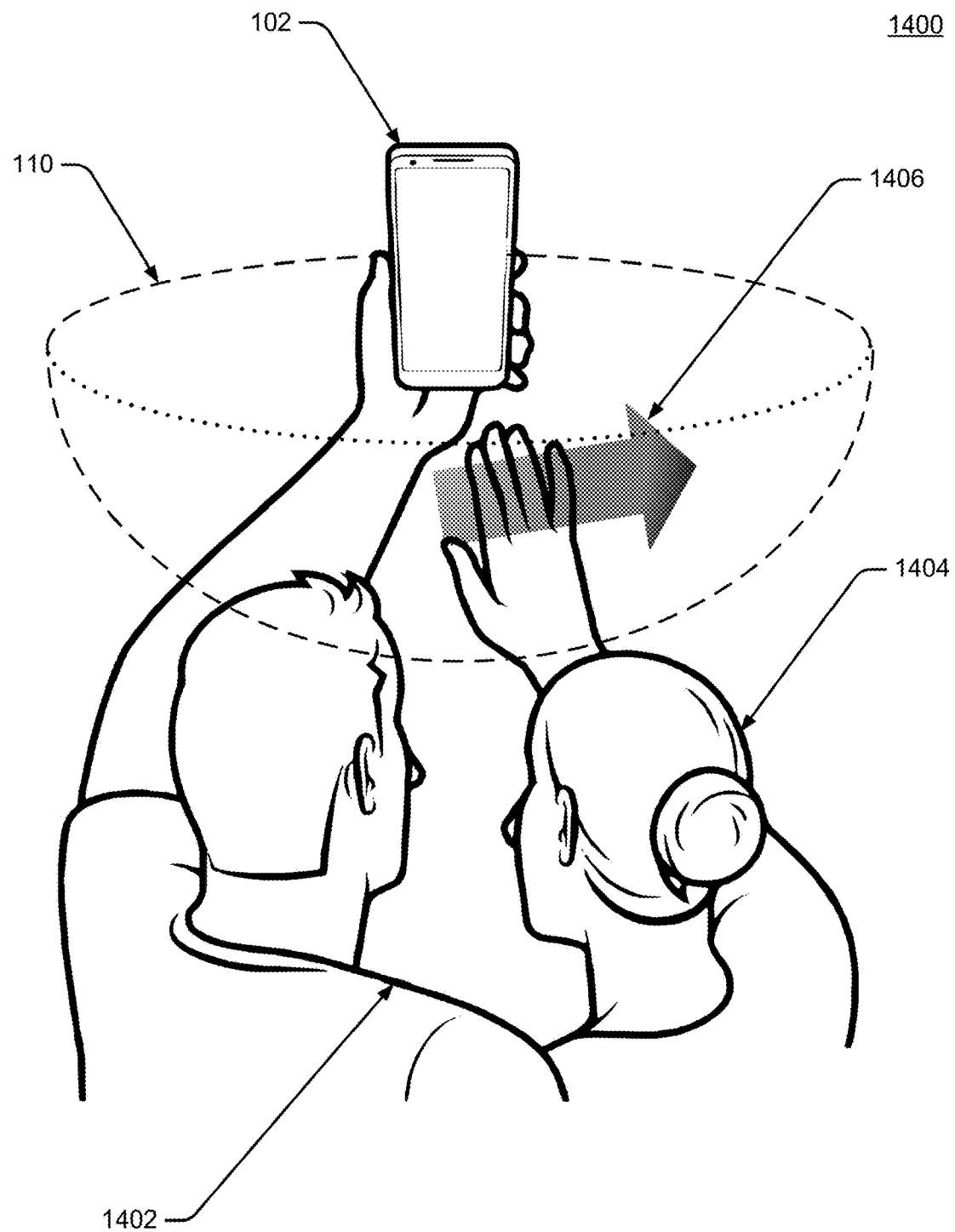

FIG. 14 depicts an example implementation 1400 of the electronic device, in this case, the smartphone 102, which is being held up by a user 1402, who is positioning the smartphone 102 to take a photograph with another user 1404 (e.g., a "selfie"). The smartphone 102 includes the radar system 104, which is providing the radar field 110. In the example implementation 1000, assume that the interaction manager has determined that the user 1404 intends to interact with the smartphone 102 (e.g., by determining that the user 102 reached toward the smartphone 102). In response, the interaction manager is maintaining the radar system in the interaction mode, so that the user 1404 can interact with the smartphone 102. For example, as shown in FIG. 14, the user 1404 is interacting with the smartphone 102 by making a swiping gesture, shown by an arrow 1406. The swiping gesture can cause the smartphone 102 to apply a filter, adjust a zoom level, change a flash setting, and so forth. Other 3D gestures, such as a tap, twist, or rotation, may control other camera functions, allowing the users 1402 and 1404 to comfortably take the photograph, without over-stretching or posing in an unnatural way in order to reach the controls.

Figure 15:
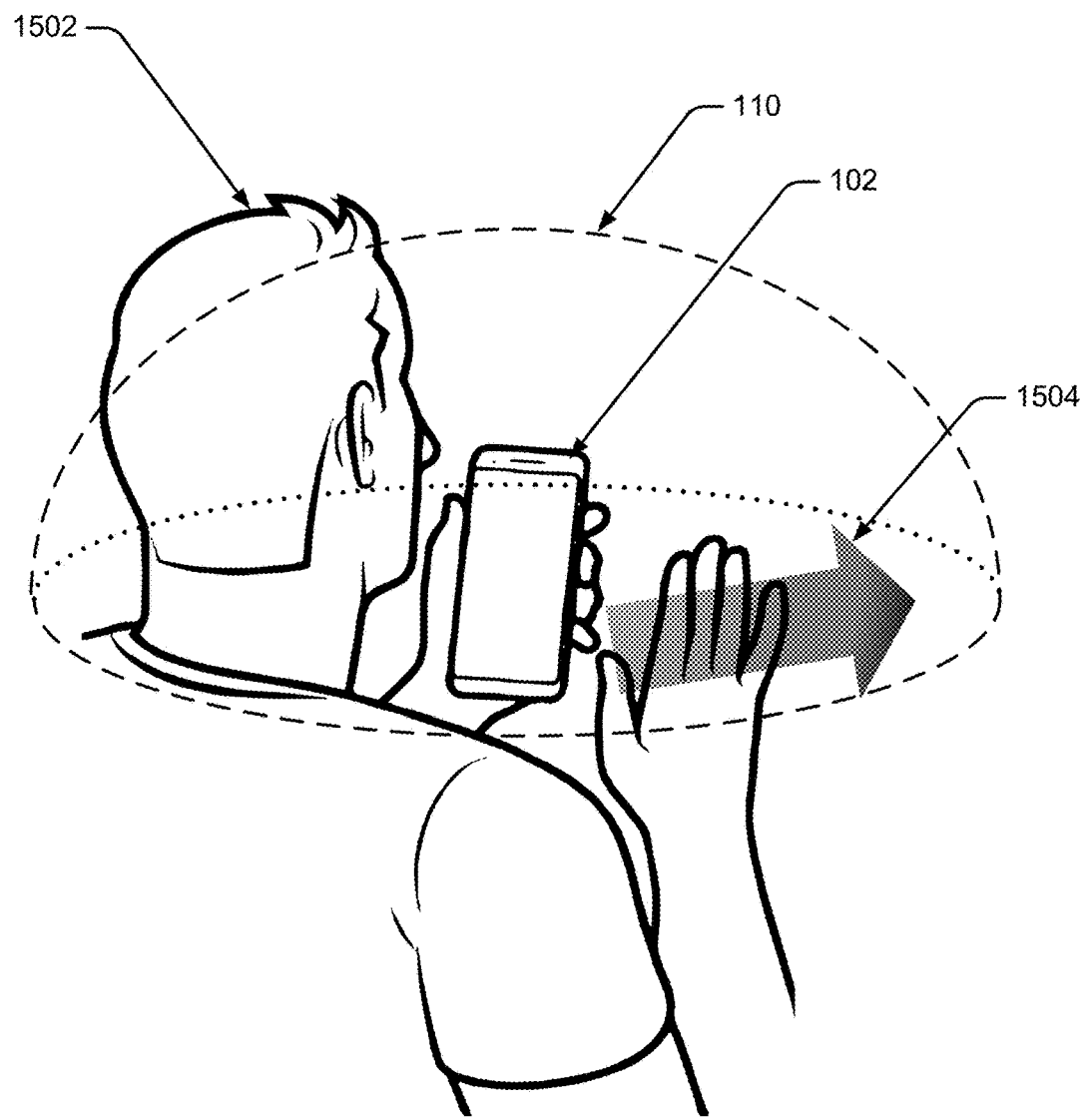

FIG. 15 depicts an example implementation 1500 of the electronic device (in this case, the smartphone 102, which is being held by a user 1502, who is working on a task that requires using multiple applications on the smartphone 102). The smartphone 102 includes the radar system 104, which is providing the radar field 110. In the example implementation 1500, assume that the interaction manager has determined that the user 1002 intends to interact with the smartphone 102 (e.g., by determining that the user 102 leaned down toward and picked up the smartphone 102). In response, the interaction manager is maintaining the radar system in the interaction mode, so that the user 1502 can interact with the smartphone 102. For example, as shown in FIG. 15, the user 1502 is interacting with the smartphone 102 by making a swiping gesture, shown by an arrow 1504. The swiping gesture can cause the smartphone 102 to switch between different applications (e.g., forward and backward chronologically or in a predefined order).

Figure 16:
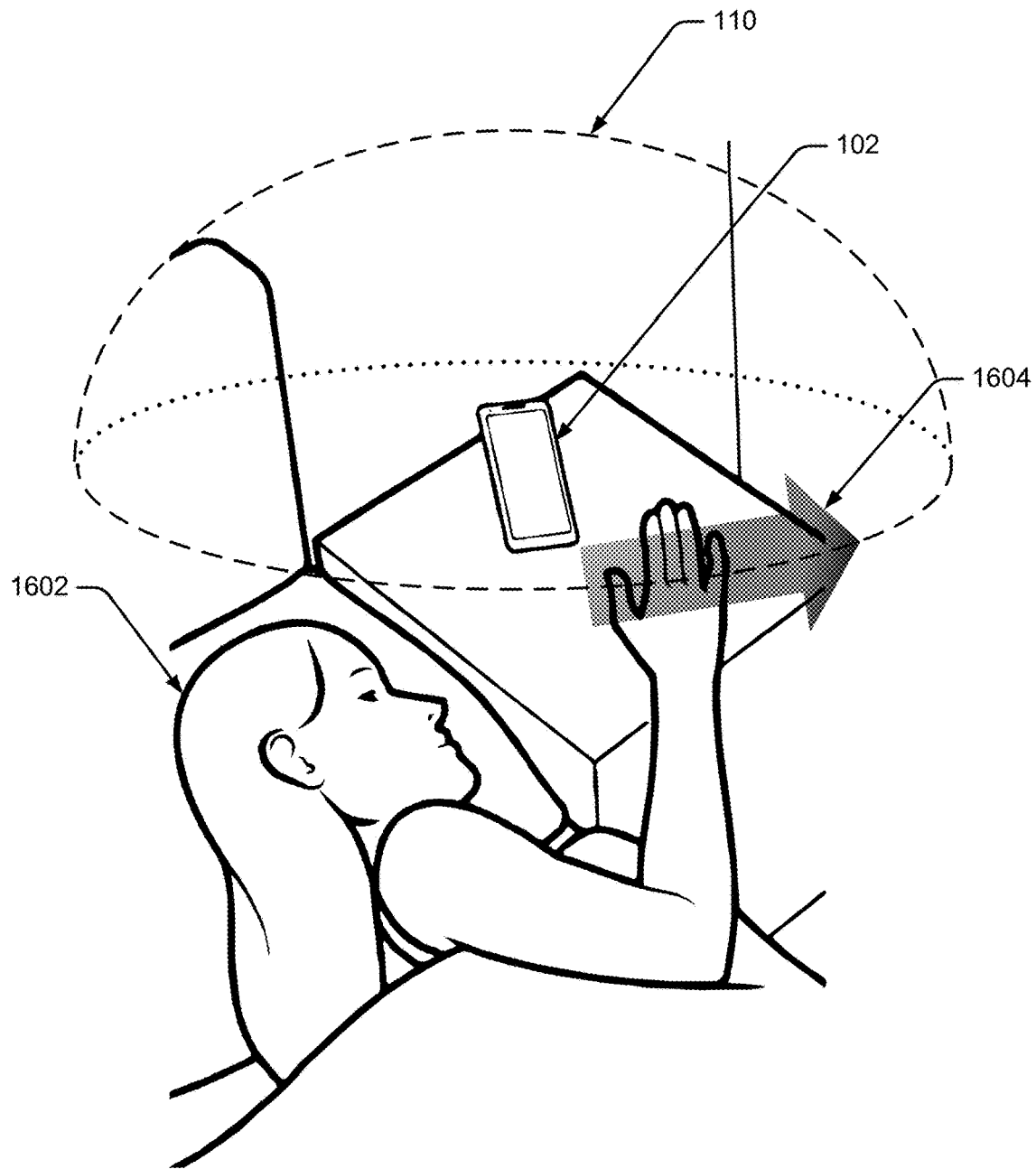

FIG. 16 depicts an example implementation 1600 of the electronic device (in this case, the smartphone 102, which is on a bedside table near a user 1602). The smartphone 102 includes the radar system 104, which is providing the radar field 110. In the example implementation 1600, assume that the interaction manager has determined that the user 1002 intends to interact with the smartphone 102 (e.g., by determining that the user 102 reached toward the smartphone 102). In response, the interaction manager is maintaining the radar system in the interaction mode, so that the user 1602 can interact with the smartphone 102. For example, in FIG. 16, further assume that a morning alarm has awakened the user 1602, who is interacting with the smartphone 102 by making a swiping gesture, shown by an arrow 1604. The swiping gesture can cause the smartphone 102 to turn off or delay (e.g., snooze) the alarm so that the user 1602 can prepare to get out of bed without having to find a touch input on an alarm interface.

Figure 17:
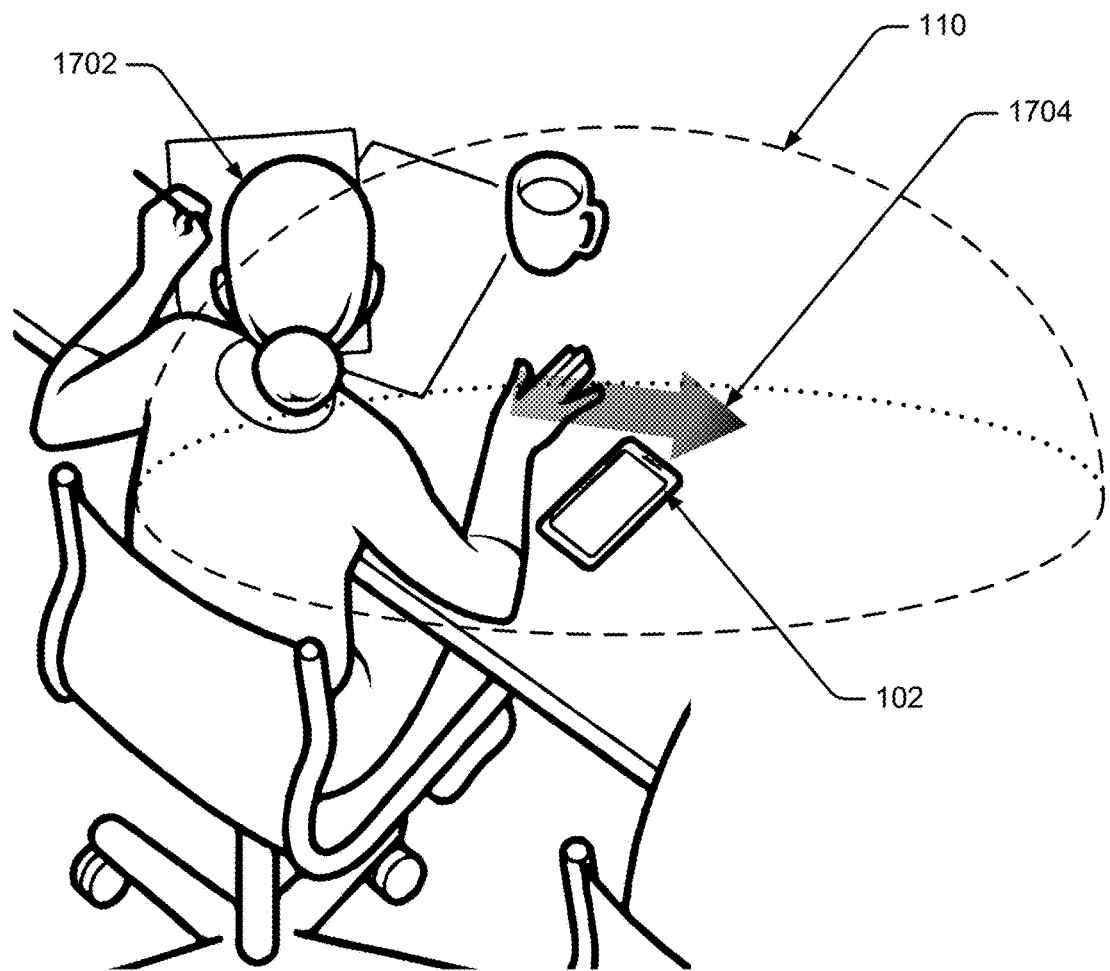

FIG. 17 depicts an example implementation 1700 of the electronic device (in this case, the smartphone 102, which is on a table near a user 1702, who is working on a task that does not require using the smartphone 102). The smartphone 102 includes the radar system 104, which is providing the radar field 110. In the example implementation 1700, assume that the interaction manager has determined that the user 1002 intends to interact with the smartphone 102 (e.g., by determining that the user 102 reached toward the smartphone 102, even though the user 1702 did not turn toward the smartphone 102). In response, the interaction manager is maintaining the radar system in the interaction mode, so that the user 1702 can interact with the smartphone 102. For example, in FIG. 17, further assume that the smartphone 102 is ringing (receiving a phone call), but the user 1702 does not want to be interrupted. The user 1702 interacts with the smartphone 102 by making a swiping gesture, shown by an arrow 1704. The swiping gesture can cause the smartphone 102 to silence the ringer or send the phone call to voicemail so that the user 1702 can complete the current task without having to answer the call or find a touch input.

Figure 18:
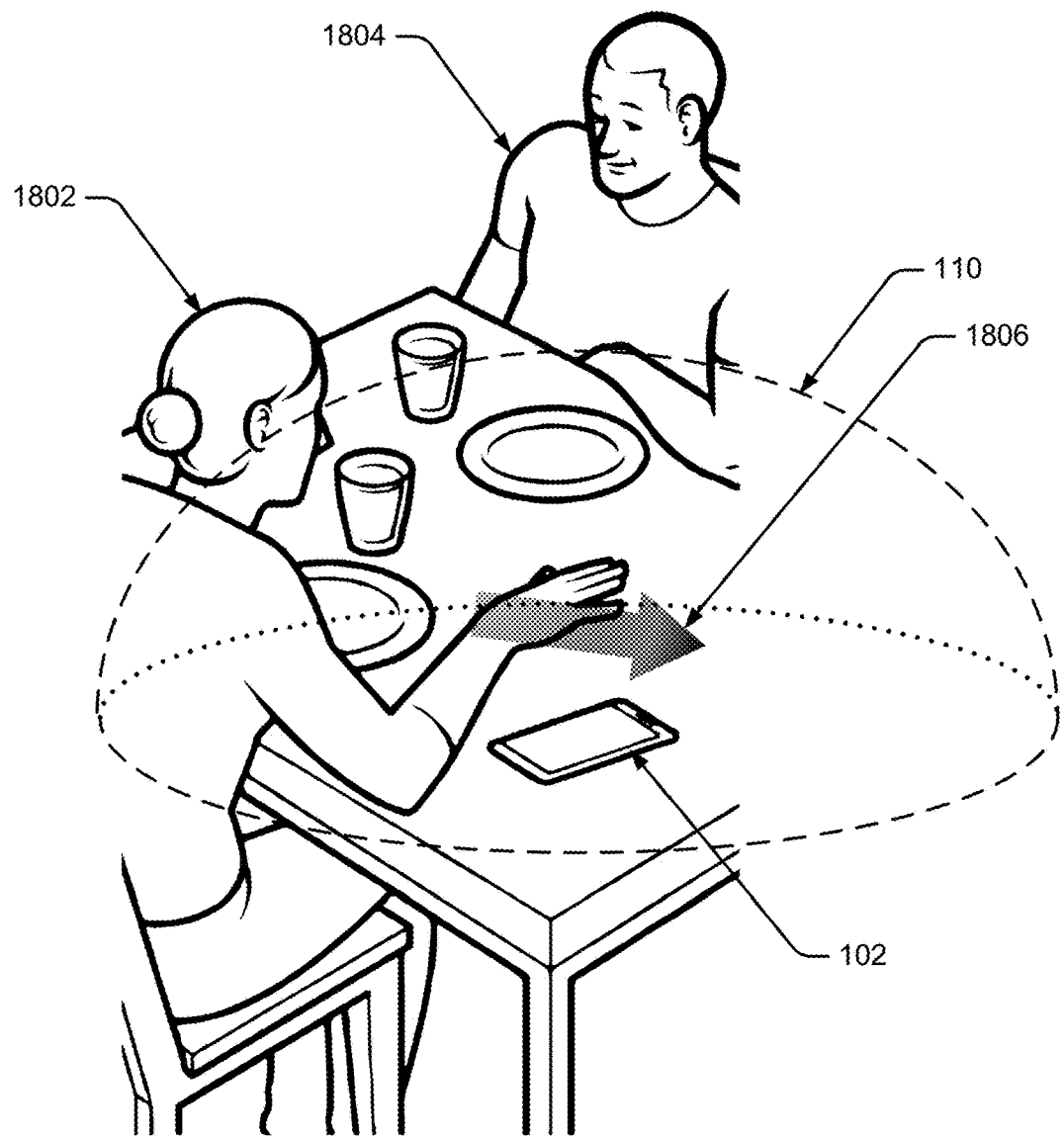

FIG. 18 depicts an example implementation 1800 of the electronic device (in this case, the smartphone 102, which is on a table near a user 1802, who is having a meal with another user 1804). The smartphone 102 includes the radar system 104, which is providing the radar field 110. In the example implementation 1800, assume that the interaction manager has determined that the user 1002 intends to interact with the smartphone 102 (e.g., by determining that the user 102 reached toward the smartphone 102, even though the user 1802 did not turn toward the smartphone 102). In response, the interaction manager is maintaining the radar system in the interaction mode, so that the user 1802 can interact with the smartphone 102. For example, in FIG. 18, further assume that the smartphone 102 is displaying a notification, but the user 1802 does not want to be interrupted. The user 1802 interacts with the smartphone 102 by making a swiping gesture, shown by an arrow 1806. The swiping gesture can cause the smartphone 102 to hide and postpone the notification so that the user 1802 can enjoy the meal without having to address the notification or find a touch input.

As shown in the examples illustrated in FIGS. 12-18, the techniques of the methods 700 and/or 1000 can enable users to interact with the smartphone 102 without taking the smartphone 102 out of a pocket or other container, or having to touch the smartphone 102. The techniques thereby provide several advantages. For example, the interaction space of the smartphone 102 (and other electronic devices) is extended beyond the screen, which keeps the electronic devices useful and accessible when a touch screen or other input method would be inconvenient, unsafe or uncomfortable. Further, the techniques allow users to quickly access and interact with their electronic devices (e.g., silencing alarms or alerts), without getting distracted, so that the users can take advantage of updates and information available via the electronic devices, but remain mostly undistracted as well.

It should be noted that these techniques for a smartphone-based radar system for determining user intention in a lower-power mode may be more secure than other techniques. Not only are 3D gestures (especially user-defined gestures, micro-gestures, and posture- or position-based gestures) not typically obtainable by an unauthorized person (unlike, for example, a password), but also because a radar image of the user, even if it includes the user's face, does not visually identify the user like a photograph or video does. Even so, further to the descriptions above, the user may be provided with controls allowing the user to make an election as to both whether and when any of the systems, programs, modules, or features described in this document may enable collection of user information (e.g., information about a user's social network, social actions or activities, profession, a user's preferences, or a user's current location), and whether the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user may have control over what information is collected about the user, how that information is used, and what information is provided to or about the user.

Example Computing System

Figure 19:
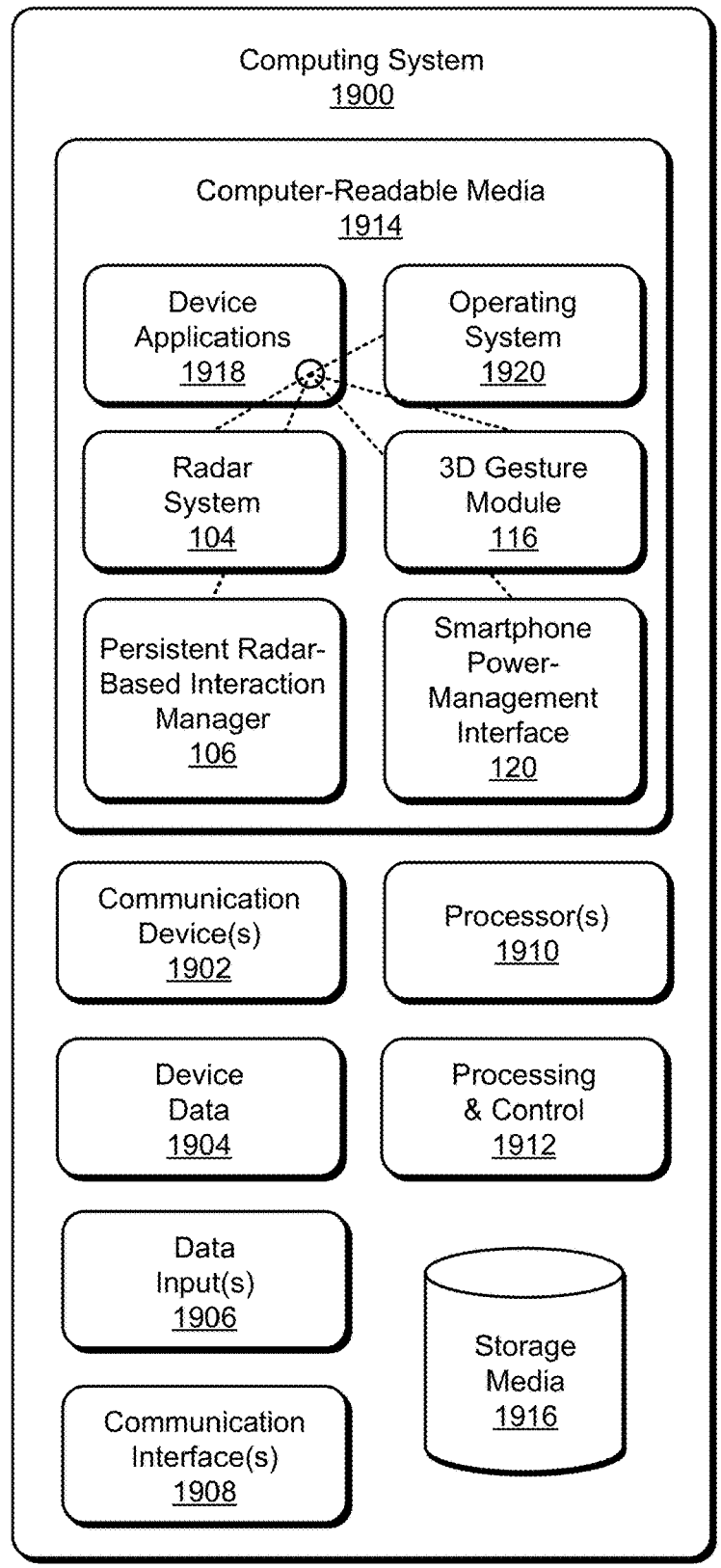
FIG. 19 illustrates various components of an example computing system that can be implemented as any type of client, server, and/or electronic device as described with reference to FIGS. 1-18 to implement, or in which techniques may be implemented that enable, a smartphone-based radar system for determining user intention in a lower-power mode.

FIG. 19 illustrates various components of an example computing system 1900 that can be implemented as any type of client, server, and/or electronic device as described with reference to the previous FIGS. 1-18 to implement a smartphone-based radar system for determining user intention in a lower-power mode.

The computing system 1900 includes communication devices 1902 that enable wired and/or wireless communication of device data 1904 (e.g., radar data, 3D gesture data, authentication data, reference data, received data, data that is being received, data scheduled for broadcast, and data packets of the data). The device data 1904 or other device content can include configuration settings of the device, media content stored on the device, and/or information associated with a user of the device (e.g., an identity of a person within a radar field or customized gesture data). Media content stored on the computing system 1900 can include any type of radar, biometric, audio, video, and/or image data. The computing system 1900 includes one or more data inputs 1906 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source. The data inputs 1906 may include, for example, the interaction manager 106, the 3D gesture module 116, or the smartphone power-management interface 118.

The computing system 1900 also includes communication interfaces 1908, which can be implemented as any one or more of a serial and/or parallel interface, a wireless interface, any type of network interface, a modem, and as any other type of communication interface. The communication interfaces 1908 provide a connection and/or communication links between the computing system 1900 and a communication network by which other electronic, computing, and communication devices communicate data with the computing system 1900.

The computing system 1900 includes one or more processors 1910 (e.g., any of microprocessors, controllers, or other controllers) that can process various computer-executable instructions to control the operation of the computing system 1900 and to enable techniques for, or in which can be implemented, a smartphone-based radar system for determining user intention in a lower-power mode. Alternatively or additionally, the computing system 1900 can be implemented with any one or combination of hardware, firmware, or fixed logic circuitry that is implemented in connection with processing and control circuits, which are generally identified at 1912. Although not shown, the computing system 1900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1900 also includes computer-readable media 1914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1900 can also include a mass storage media device (storage media) 1916.

The computer-readable media 1914 provides data storage mechanisms to store the device data 1904, as well as various device applications 1918 and any other types of information and/or data related to operational aspects of the computing system 1900. For example, an operating system 1920 can be maintained as a computer application with the computer-readable media 1914 and executed on the processors 1910. The device applications 1918 may include a device manager, such as any form of a control application, software application, signal-processing and control modules, code that is native to a particular device, an abstraction module, a gesture recognition module, and other modules. The device applications 1918 may also include system components, engines, or managers to implement a smartphone-based radar system for determining user intention in a lower-power mode, such as the radar system 104, the interaction manager 106, the 3D gesture module 116, or the smartphone power-management interface 118. The computing system 1900 may also include, or have access to, one or more machine learning systems.

CONCLUSION

Although implementations of techniques for, and apparatuses enabling, a smartphone-based radar system for determining user intention in a lower-power mode have been described in language specific to features and/or methods, it is to be understood that the subject of the appended claims is not necessarily limited to the specific features or methods described. Rather, the specific features and methods are disclosed as example implementations enabling a smartphone-based radar system for determining user intention in a lower-power mode.

What is claimed is:
1. An electronic device, comprising:
a radar system, implemented at least partially in hardware, configured to:
provide a radar field;
sense reflections from an object in the radar field;
provide an analysis of the reflections from the object; and
provide, based on the analysis of the reflections, radar data; and
one or more computer-readable media having instructions stored thereon that, responsive to execution by one or more computer processors, implement a persistent radar-based interaction manager configured to:
maintain the radar system in an idle mode, the idle mode:
requiring no more than a first threshold of power; and
comprising the radar system operating with a first set of radar characteristics comprising at least one of a first maximum transmit power available to the radar system, a first set of sensors available to the radar system, a first set of one or more processors available to the radar system, or a first duty cycle of the radar system;
determine, based on the radar data, whether a presence of the object is within an awareness zone of the electronic device; and
responsive to a determination that the object is within the awareness zone, cause the radar system to exit the idle mode and enter an interaction mode, the interaction mode:
requiring no more than a second threshold of power, the second threshold of power greater than the first threshold of power; and
comprising the radar system operating with a second set of radar characteristics comprising at least one of a second maximum transmit power available to the radar system, a second set of sensors available to the radar system, a second set of one or more processors available to the radar system, or a second duty cycle of the radar system.

2. The electronic device of claim 1, wherein the first threshold of power is approximately eight milliwatts (mW) and the second threshold of power is approximately 55 mW of power.

3. The electronic device of claim 1, wherein the first threshold of power is approximately two milliwatts (mW) and the second threshold of power is approximately 20 mW of power.

4. The electronic device of claim 1, wherein the first threshold of power is approximately one milliwatt (mW) and the second threshold of power is approximately three mW of power.

5. The electronic device of claim 1, wherein the first set of radar characteristics or the second set of radar characteristics are based on a remaining power level of the electronic device.

6. The electronic device of claim 1, wherein:
the first set of radar characteristics comprises the first duty cycle, the first duty being less than 5 hertz (Hz); and
the second set of radar characteristics comprises the second duty cycle, the second duty cycle being greater than 10 Hz.

7. The electronic device of claim 1, wherein:
the electronic device further comprises a low-power processor and a high-power processor, the low-power processor having a lesser amount of memory or a lesser computational capability than the high-power processor;

the first set of radar characteristics comprises the first set of one or more processors available to the radar system, the first set of one or more processors available to the radar system including the low-power processor; and the second set of radar characteristics comprises the second set of one or more processors available to the radar system, the second set of one or more processors available to the radar system including the high-power processor.

8. The electronic device of claim 1, wherein when maintaining the radar system in the idle mode, the radar system maintains one or more transceiver components in an off state, the one or more transceiver components including at least one of:
a voltage-controlled oscillator;
a multiplexer;
and analog-to-digital converter;
a phase lock loop; or
a crystal oscillator.

9. The electronic device of claim 1, wherein when entering the interactive mode, the radar system turns on one or more transceiver components, the one or more transceiver components including at least one of:
a voltage-controlled oscillator;
a multiplexer;
and analog-to-digital converter;
a phase lock loop; or
a crystal oscillator.

10. The electronic device of claim 1, wherein the persistent radar-based interaction manager is further configured to:
when maintaining the radar system in the idle mode, control a first set of sensors or external components available to the electronic device; and
when operating the radar system in the interaction mode, control a second set of sensors or external components available to the electronic device, the second set of sensors or external components available to the electronic device different than the first set of sensors or external components available to the electronic device.

11. The electronic device of claim 1, wherein the determination of whether a presence of the object is within an awareness zone of the electronic device is based at least in part on a prediction output from a machine-learned model, the machine-learned model taking the radar data as an input.

12. The electronic device of claim 1, wherein the first duty cycle is less than or equal to 5 Hz and the second duty cycle is greater than or equal to 10 Hz.

13. A method implemented in an electronic device that includes a radar system, the method comprising:
providing, by the radar system, a radar field;
sensing, by the radar system, reflections from an object in the radar field;
analyzing the reflections from the object;
providing, based on an analysis of the reflections, radar data;
maintaining the radar system in an idle mode, the idle mode:
requiring no more than a first threshold of power; and
comprising the radar system operating with a first set of radar characteristics comprising at least one of a first maximum transmit power available to the radar system, a first set of sensors available to the radar system, a first set of one or more processors available to the radar system, or a first duty cycle of the radar system; and determining, based on the radar data, whether a presence of the object is within an awareness zone of the electronic device;

responsive to determining that the object is within the awareness zone, causing the radar system to exit the idle mode and enter an interaction mode, the interaction mode:
requiring no more than a second threshold of power, the second threshold of power greater than the first threshold of power; and
comprising the radar system operating with a second set of radar characteristics comprising at least one of a second maximum transmit power available to the radar system, a second set of sensors available to the radar system, a second set of one or more processors available to the radar system, or a second duty cycle of the radar system.

14. The method of claim 13, wherein the first threshold of power is approximately eight milliwatts (mW) and the second threshold of power is approximately 55 mW of power.

15. The method of claim 13, wherein the first threshold of power is approximately two milliwatts (mW) and the second threshold of power is approximately 20 mW of power.

16. The method of claim 13, wherein the first threshold of power is approximately one milliwatt (mW) and the second threshold of power is approximately three mW of power.

17. The method of claim 13, wherein the first set of radar characteristics or the second set of radar characteristics are based on a remaining power level of the electronic device.

18. The method of claim 13, wherein:
the first set of radar characteristics comprises the first duty cycle, the first duty being less than 5 hertz (Hz); and
the second set of radar characteristics comprises the second duty cycle, the second duty cycle being greater than 10 Hz.

19. The method of claim 13, wherein:
the first set of radar characteristics comprises the first set of one or more processors available to the radar system, the first set of one or more processors available to the radar system including a low-power processor; and
the second set of radar characteristics comprises the second set of one or more processors available to the radar system, the second set of one or more processors available to the radar system including a high-power processor, the high-power processor having a greater amount of memory or a greater computational capability than the low-power processor.

20. The method of claim 13, further comprising, when maintaining the radar system in the idle mode, maintaining one or more transceiver components in an off state, the one or more transceiver components including at least one of:
a voltage-controlled oscillator;
a multiplexer;
and analog-to-digital converter;
a phase lock loop; or
a crystal oscillator.

21. The method of claim 13, further comprising, when entering the interactive mode, turning on one or more transceiver components, the one or more transceiver components including at least one of:
- a voltage-controlled oscillator;
- a multiplexer;
- and analog-to-digital converter;
- a phase lock loop; or
- a crystal oscillator.

22. The method of claim 13, further comprising:
- when maintaining the radar system in the idle mode, controlling a first set of sensors or external components available to the electronic device; and
- when operating the radar system in the interaction mode, controlling a second set of sensors or external components available to the electronic device, the second set of sensors or external components available to the electronic device different than the first set of sensors or external components available to the electronic device.

\* \* \* \* \*